(12) United States Patent
Dehé et al.

(10) Patent No.: US 12,111,249 B2
(45) Date of Patent: Oct. 8, 2024

(54) MEMS-BASED PHOTOACOUSTIC CELL

(71) Applicant: Hahn-Schickard-Gesellschaft für Angewandte Forschung e. V., Villingen-Schwenningen (DE)

(72) Inventors: Alfons Dehé, Reutlingen (DE); Achim Bittner, Heilbronn (DE); Lenny Castellanos, Oberndorf am Neckar (DE); Sophie Billat, Villingen-Schwenningen (DE); Frank Hedrich, Villingen-Schwenningen (DE)

(73) Assignee: Hahn-Schickard-Gesellschaft für Angewandte Forschung e.V., Villingen-Schwenningen (DE)

( * ) Notice: Subject to any disclaimer, the term of this patent is extended or adjusted under 35 U.S.C. 154(b) by 210 days.

(21) Appl. No.: 17/638,665

(22) PCT Filed: Aug. 31, 2020

(86) PCT No.: PCT/EP2020/074205
§ 371 (c)(1),
(2) Date: Feb. 25, 2022

(87) PCT Pub. No.: WO2021/038099
PCT Pub. Date: Mar. 4, 2021

(65) Prior Publication Data
US 2022/0299427 A1 Sep. 22, 2022

(30) Foreign Application Priority Data

Aug. 29, 2019 (EP) ..................... 19194295

(51) Int. Cl.
*G01N 21/17* (2006.01)
*G01N 29/24* (2006.01)
(Continued)

(52) U.S. Cl.
CPC ..... *G01N 21/1702* (2013.01); *G01N 29/2425* (2013.01); *G01N 2021/1704* (2013.01);
(Continued)

(58) Field of Classification Search
CPC .......... G01N 21/1702; G01N 29/2425; G01N 2021/1704; G01N 2021/1708; G01N 2201/0686; G01F 1/6845
See application file for complete search history.

(56) References Cited

U.S. PATENT DOCUMENTS 5,468,962 A    11/1995   Ohishi et al.
7,034,943 B1 *   4/2006   Moeckli ............... C07K 14/705
                                                           356/423

FOREIGN PATENT DOCUMENTS

DE          4116280 A1    12/1991
JP        H08122251 A1    5/1996
(Continued)

OTHER PUBLICATIONS

International Search Report in PCT/EP2020/074205, issued Jan. 28, 2021.
(Continued)

*Primary Examiner* — Suman K Nath
(74) *Attorney, Agent, or Firm* — Knobbe, Martens, Olson & Bear, LLP

(57) ABSTRACT

In a first aspect, the invention relates to a photoacoustic gas sensor comprising a gas-fillable detection chamber and a reference chamber arranged laterally adjacent to each other and connected by a sensor channel. A sensor located at or in the sensor channel allows measurement of the photoacoustic signals. Both chambers are preferably located in a plane perpendicular to the emitted IR radiation of the IR emitter which is also comprised. The gas sensor is also formed from a multilayer substrate.

(Continued)

In further aspects, the invention also relates to a method of manufacturing a gas sensor and a method of analyzing gas with a gas sensor.

23 Claims, 9 Drawing Sheets

(52) U.S. Cl.
CPC ............... *G01N 2021/1708* (2013.01); *G01N 2201/0686* (2013.01)

(56) References Cited

FOREIGN PATENT DOCUMENTS

| | | |
|---|---|---|
| JP | 2003057087 A | 2/2003 |
| JP | 2005274515 A | 10/2005 |
| WO | WO 96/24831 A1 | 8/1996 |

OTHER PUBLICATIONS

Keränen, K., et al., "Differential photoacoustic gas cell based on LTCC for ppm gas sensing", *Proceedings of SPIE*, vol. 7607 (2010), in 12 pages.

Pellegrino, Paul M., "Miniature photoacoustic chemical sensor using microelectromechanical structures", *Proceedings of SPIE*, vol. 5416 (2004), in 12 pages.

\* cited by examiner

MEMS-BASED PHOTOACOUSTIC CELL

In a first aspect, the invention relates to a photoacoustic gas sensor comprising a gas-fillable detection chamber and a reference chamber arranged laterally adjacent to each other and connected by a sensor channel. A sensor located at or in the sensor channel allows measurement of the photoacoustic signals. Both chambers are preferably located in a plane perpendicular to the emitted IR radiation of the IR emitter which is also comprised. The gas sensor is also formed from a multilayer substrate.

In further aspects, the invention relates to a method of manufacturing a gas sensor and a method of analyzing gas with a gas sensor.

BACKGROUND AND PRIOR ART

Photoacoustic spectroscopy (PAS) allows the detection of very fine concentrations of gases and has a variety of applications. One example is the detection of $CO_2$, which plays a role in research and air conditioning technology. The concentration of e.g. exhaust gases in the air can also be measured in this way. Military applications are also relevant, where the smallest concentrations of toxic gas can be detected.

Photoacoustic spectroscopy uses intensity-modulated infrared radiation with frequencies in the absorption spectrum of a molecule to be detected in a gas. If this molecule is present in the beam path, modulated absorption takes place, leading to heating and cooling processes whose time scales reflect the modulation frequency of the radiation. The heating and cooling processes lead to expansions and contractions of the gas, causing sound waves at the modulation frequency. These can then be measured by sound detectors, such as microphones, or flow sensors.

Photoacoustic gas sensors consist of the components emitter, detector and cell. There can also be several cells. The cell is usually made of steel mesoscopically in the form of a cylinder, see e.g. [1] as well as US 2018 005 9066 A1. This prevents further miniaturization.

Efforts for miniaturization are also known from the prior art. For example, in DE 20 2015 002 315 a vertically integrated MEMS system is proposed, which has two or more cells vertically stacked in the radiation direction of an IR emitter. However, such a vertical arrangement has various disadvantages. For example, the detector and the second cell may be affected by the IR radiation because they are also arranged in the direction of radiation. This concerns in particular the IR radiation, which cannot be absorbed in the medium of the first cell and thus penetrates into the second cell (usually the reference chamber) and produces an undesired signal there. Also the detector/sensor itself can absorb heat from the radiation and thus be distorted.

A photoacoustic gas sensor, without these disadvantages and which is manufactured completely in MEMS technology, is so far unknown.

Objective of the Invention

The objective of the invention is to provide a gas sensor in the form of a photoacoustic spectroscope as well as a method for gas measurement and a manufacturing method for gas sensors without the disadvantages of the prior art. In particular, one objective of the invention was to provide an improved gas sensor based on a photoacoustic spectroscope, which can measure a gas concentration compactly, robustly and with high sensitivity and accuracy, and at the same time is characterized by a simple, low-cost, mass-production process, in which all components can be manufactured in only a few steps and directly integrated.

SUMMARY OF THE INVENTION

The objective is solved by the features of the independent claims. Preferred embodiments of the invention are described in the dependent claims.

In a first aspect, the invention preferably relates to a photoacoustic gas sensor comprising
 a modulable infrared emitter,
 a detection chamber that can be filled with gas,
 a reference chamber,
 a sensor channel connecting the detection chamber to the reference chamber, and
 a sensor which is located in or near the sensor channel,
wherein the detection chamber is located in the beam path of the infrared emitter so that the infrared emitter can excite gas in the detection chamber by means of modulable emittable infrared radiation to form sound pressure waves which are detectable in the sensor channel by means of the sensor, wherein the detection chamber, the sensor channel, the reference chamber as well as the sensor are arranged in a lateral plane which extends substantially perpendicularly to the direction of radiation from the IR emitter. The sensor may also preferably be referred to as the sensor element. The sensor or the sensor element is preferably arranged to detect an equalization of the sound pressure through the sensor channel from the detector chamber into the reference chamber. A detection of sound pressure waves in the sensor channel by means of the sensor or sensor element is preferably to be understood in this sense.

In a preferred embodiment, the detection chamber, the sensor channel, the reference chamber, and the sensor are located in a multilayer substrate.

In this gas sensor, the detection chamber and reference chamber are preferably arranged in a plane next to each other and perpendicular to the direction of radiation from the IR emitter and formed in a multilayer substrate. Due to this arrangement and the use of a sensor in the sensor channel located between the chambers, a simple manufacturing method and compact design with low height can be achieved.

Since the detection chamber and the reference chamber are arranged laterally next to each other and the radiation of the IR emitter is directed substantially perpendicular to this plane of arrangement, it can be achieved, in particular, by simultaneously focusing the beam on the detection chamber, that only the detection chamber and not the reference chamber is irradiated. If modulated absorption then takes place in the detection chamber due to the presence of a gas component, pressure equalization to the preferably non-irradiated reference chamber is established via the sensor channel, which can be measured by the sensor in the sensor channel. This avoids interferences and increases the sensitivity.

Due to the compact design in a multilayer substrate with a sensor, an integrated design comprising the essential components of the gas sensor can be achieved. This can also be highly miniaturized. The realization in a multilayer substrate simplifies the manufacturing process.

Advantageously, standardized manufacturing processes for semiconductors and/or MEMS production can be used. The sensor allows the dimensions of the sensor channel in particular to be selected independently of the size of the other components of the gas sensor and to be adapted to specific requirements, e.g. a desired sensitivity of the sensor with respect to the pressure changes in the detection chamber.

A photoacoustic gas sensor is known to the person skilled in the art in its basic features or essential components. A modulable emitter generates electromagnetic radiation in the infrared wavelength range and is preferably arranged and configured in such a way that the infrared radiation emitted by the infrared emitter is essentially or at least partially incident on the gas in the detection chamber.

If the modulated irradiation takes place with an infrared wavelength corresponding to the absorption spectrum of a molecule of a gas component present in the gas mixture, modulated absorption takes place, which causes heating and cooling processes whose time scales reflect the modulation frequency of the radiation. According to the photoacoustic effect, the heating and cooling processes cause expansions and contractions of the gas component causing it to form sound pressure waves with substantially the modulation frequency. The sound pressure waves are also referred to as PAS signals and can be measured by means of a sensor, for example a sound detector or flow sensor. The power of the sound waves is preferably directly proportional to the concentration of the absorbing gas component.

The term gas component is preferably understood to mean the proportion of chemically (and spectroscopically) identical gas molecules (e.g. $CO_2$, methane, nitrogen, etc.) in a gas mixture, while the gas mixture means the totality or mixture of multiple (preferably different) gas components (e.g. natural gas, air, etc.).

Various infrared (IR) emitters are preferred as radiation sources for the aforementioned applications. For example, narrowband laser sources in the infrared range can be used. Advantageously, these allow the use of high radiation intensities and can be modulated with standard components for photoacoustic spectroscopy, preferably at high frequencies. However, due to the narrow spectrum of the laser, only those molecules are detectable which have a corresponding absorption spectrum. Therefore, several lasers are preferably used if different molecules are to be detected.

The IR emitter is preferably arranged in a linear arrangement to the detection chamber. This preferably means that the IR emitter is arranged from a point on the connecting line between the detection chamber and the reference chamber at a right angle to the connecting line. Preferably, the IR emitter may be directly adjacent to and irradiate the detection chamber and/or the reference chamber. However, it may also be preferred that a free area is arranged between the IR emitter and the detection chamber and/or reference chamber, in which the IR beam traverses a free beam path.

Preferably, thermal broadband emitters can also be used. Advantageously, these have a broad spectrum which can be further selected, for example, by using (tunable) filters. Due to thermal time constants, the modulation frequency for direct modulation is preferably in the range of a few Hz to approx. 100 Hz.

A modulable infrared emitter preferably refers to a device that emits electromagnetic radiation in a range of wavelengths in the infrared (IR) range, particularly between about 700 nanometers (nm) and 1 millimeter (mm) wavelength. The corresponding frequency of the emitted radiation may be in the range between about 300 gigahertz (GHz) to 400 terrahertz (THz). The spectrum may just as preferably be represented in terms of wavenumber $m^{-1}$ or $cm^{-1}$ as is common in the field of spectroscopy. A person skilled in the art knows how to convert between these units.

In particular, the spectrum is selected to correspond to the preferred field of application of the emitter, namely infrared spectroscopy and especially photoacoustic spectroscopy. In particular, the vibrational excitation of the gas molecules to be spectroscoped and/or detected is preferred, which correspond to a preferred spectral range depending on the gas molecules. For example, a spectral range of about 4.2 micrometers (μm) is suitable for the excitation of $CO_2$ molecules. Particularly preferred wavelength ranges of infrared radiation are 700 nm to 10 μm, preferably 1 to 10 μm, particularly preferably 2 μm to 10 μm.

To generate the infrared radiation, thermal energy is preferably provided in the form of a heating element. A (micro) heating element is particularly preferred. A microheating element preferably means a heating element with dimensions in the order of micrometers (μm). Here, the heating element comprises a heatable layer made from a conductive material which produces Joule heat when an electric current flows through it. The heat produced preferably exhibits a dependence on the ohmic resistance of the element and the square of the current or the square of the applied voltage and the inverse ohmic resistance, depending on whether a current or voltage source is used. A thermal source of infrared radiation has advantageous properties for PAS, such as broadband emission, through which a wide variety of gas atoms or molecules can be excited with only one light source. At the same time, a thermal IR emitter is particularly inexpensive, easy to manufacture and durable.

In a state of equilibrium, the heat produced is equal to the heat losses due to thermal conduction, convection and thermal radiation (synonym: thermal radiation, infrared radiation), which is emitted at the outer boundary surfaces of the heatable layer through which the current flows. As is known to the person skilled in the art, the heat produced causes, among other things, thermal radiation, in particular due to thermal movement of particles, which results, inter alia, in an acceleration of charge carriers and/or oscillating dipole moments. Thus, infrared radiation can be specifically generated by a current-carrying heatable layer. The heatable layer is preferably made of metal, for example tungsten, molybdenum or platinum. By applying a suitable voltage, the resulting current flow generates Joule heat and thus ultimately infrared radiation.

The radiation spectrum of a heated body can preferably be described approximately by Planck's radiation law, whereby the differences of a real heatable layer from a black body are known to the person skilled in the art, for example the emissivity or the real deviation from a thermal equilibrium of the body. Despite these deviations, the generated spectrum and its intensity are substantially described by the temperature and the radiating area according to Planck's radiation law.

Thus, a person skilled in the art can achieve a preferred spectrum with a preferred intensity distribution by specific design of the (micro) heating element. For this purpose, in addition to the material and the geometric design of the heating element, the electrical energy made available, as well as the magnitude of the heat losses from the heating element in addition to the heat radiation are preferably decisive. The magnitude of these heat losses is determined, for example, by the thermal conductivity between the heating element and the adjacent materials and/or fluids as well as their heat capacity and the size of the interface(s).

An IR emitter in the form of a heating element is particularly cost-effective and robust, and at the same time a large number of gas molecules can be detected in the PAS due to the spectral width of the emission. By means of a preferably tunable bandpass filter, narrower spectra can be selected from the broad emission spectrum if required.

The infrared radiation can preferably also be generated by a light-emitting diode (LED) emitting in the desired infrared spectral range and/or a laser. In particular, a laser preferably has a narrow emission spectrum, such that preferably only absorption lines of gas atoms or molecules exactly matching this spectrum can be excited and thus detected. Therefore, a laser is advantageous if only certain gas molecules are to be detected, wherein the informative value of the detection with regard to the presence of these molecules is particularly high, since other molecules cannot be excited by the narrow spectrum of the laser.

The emission of the IR emitter preferably takes place as a beam, which is oriented in a preferred direction in the form of a straight line. The term beam shall hereinafter describe the preferably bundled part of the radiation along the preferred beam direction of the emitter, which is emitted by the emitter, wherein in particular the areas of greatest intensity along this direction define the beam. Intensity is preferably defined as area power density and preferably has the unit watts per square meter or abbreviated $W/m^2$.

Additional components, such as lenses, may be integrated into the emitter or attached externally to provide for bundling or collimation of the beam. A person skilled in the art knows how to shape the emission profile of the radiation source by designing the IR emitter as well as by using additional components in such a way that a desired beam profile as well as a desired beam direction result. Preferably, the modulable IR emitter can do without additional lenses, or can be a system comprising a radiation source and at least one lens for collimating the beam.

The emitter is modulable, which means that the intensity of the emitted radiation, preferably the intensity of the beam can be changed in a controllable manner over time. The modulation shall preferably cause a temporal change of the intensity as a measurable variable. This means, for example, that there is a difference in intensity over time between the weakest intensity measured within the measurement period and the strongest intensity measured within the same period that is greater than the sensitivity of an instrument typically used for the radiation spectrum and application to measure or determine intensity. Preferably, the difference is significantly greater than a factor of 2, more preferably 4, 6 or 8 between the strongest and weakest adjustable intensity. Particularly preferably, the intensity of the modulated beam is modulated for one or more predetermined resonant wavelengths.

Preferably, direct modulation can be performed by varying the current supply. In the case of a thermal emitter, such modulation is usually limited to a certain range of a modulation spectrum due to thermal time constants, e.g. in the range of an order of magnitude of up to 100 Hz. In the case of a laser or an LED, for example, much higher modulation rates are preferably possible, e.g. in the kHZ range and beyond.

Modulation of the infrared emitter can preferably also be achieved by external modulation, e.g. by using a rotating chopper wheel and/or an electro-optical modulator.

In particular, the IR emitter can be a MEMS emitter integrated (preferably monolithically) into the structure of the gas sensor.

The detection chamber can preferably be filled with gas. Here, the detection chamber is preferably a cavity in the gas sensor. This can preferably mean that even if the volume is at least partially closed or closable, there is a preferably closable opening for filling. Depending on the measurement method of the PAS, the opening can thereby preferably be designed to be resealable, whereby the gas can be exchangeable. However, it may be equally preferred to fill the chamber with gas once, for example during manufacture, and not to exchange or refill it thereafter. Preferably, a gas flow can also be realized, for example, by the detection chamber comprising at least a first opening.

Preferably, either a continuous gas flow into the chamber or a discontinuous gas flow can be realized via, for example, a first opening as inlet and a second opening as outlet, in which, for example, a filling or an exchange of the gas in the detection chamber can be carried out during a filling or gas exchange phase. In a measurement phase, for example, the gas flow can be interrupted. Preferably, different gases can be analyzed at different times, and preferably a cleaning gas can be supplied between two gases to be analyzed, in order to clean the volume of any gas residues.

The detection chamber is preferably also referred to as the detector chamber.

If the detection chamber is at least partially open to the environment, e.g. through an opening of the desired dimensions, a permanent gas exchange with an environment can advantageously take place, whereby filling of the detection chamber takes place by interaction with a gas atmosphere of the environment.

The height of the detection chamber preferably corresponds to the maximum extension of the detection chamber in the direction of the IR radiation direction. Preferably, however, the width of the detection chamber corresponds to the maximum extension in the direction of a lateral plane perpendicular to the direction of radiation, in which the detection chamber and the reference chamber are arranged next to each other.

Preferably, a depth is also defined, which is preferably perpendicular to the height and width. The depth is preferably also referred to as the length.

The dimensioning of the detection chamber, in particular with regard to these three spatial directions and the shape in general, is advantageously adapted according to the field of application and/or requirements of the gas sensor with regard to dimensions, sensitivity and/or other parameters describing the performance. Thereby, it is possible to adapt the beam dimensioning of the emitter or the dimensioning can be chosen to promote acoustic resonances. The detection chamber can preferably have a substantially cuboidal outline.

A reference chamber is also comprised, which can preferably be similar in dimensions and geometric design to the detection chamber and whose dimensions are designated as height, width and/or depth/length in to the same manner as the detection chamber.

The use of a reference chamber together with a detection chamber is a preferred measurement setup for gas analysis by photoacoustic spectroscopy. Preferably, the reference chamber can contain the same gas as the detection chamber or a reference gas with known properties. In the first case, it is preferable that substantially only the detection chamber be irradiated with IR radiation, so that sound pressure waves resulting from absorption of this radiation are preferably generated substantially there and can thus be measured by a detector or sensor preferably arranged between the two chambers. Local pressure fluctuations due to external influences, such as externally generated sound pressure waves, preferably affect both chambers and are advantageously not measured, since the sensor in particular substantially measures pressure differences between both chambers.

Likewise, in the second case, in which a reference gas is present in the reference chamber, it may be preferred that both chambers are irradiated with the modulated IR radiation, in which case it is preferably possible to draw conclusions about the composition there, in particular a composition and/or concentration that differs from the reference gas, on the basis of a different absorption behavior of the detection chamber. It may be preferred in particular that the reference chamber has a vacuum. The person skilled in the art knows that a vacuum is never absolute in reality, but is characterized by a considerably lower pressure compared to atmospheric pressure under normal conditions.

Preferably, the reference chamber can be filled with gas, either via its own, preferably closable opening. Filling during manufacture is also conceivable. It may be equally preferred that the reference chamber does not have its own opening, but is filled through the sensor channel with a gas from the detection chamber.

The sensor channel, which connects the detection chamber with the reference chamber, is preferably located between the detection chamber and the reference chamber. This preferably has a considerably reduced cross-section compared to the dimensions of the two chambers. In particular, the sensor is arranged in this sensor channel, by means of which sound pressure waves or an equalization of a sound pressure between the chambers can be detected within the sensor channel.

The sensor is preferably arranged to detect the sound pressure waves that reach the sensor channel from the detection chamber and/or the reference chamber. The sensor channel can be designed in particular in the form of a connecting tube or connecting pipe between the chambers, into which the sensor can be inserted. However, it may also be preferred that the sensor channel is formed by an aperture or opening in a partition between a detection chamber and reference chamber, wherein the sensor or sensor element is preferably at least partially installed on the partition and is arranged to measure a gas flow through the aperture.

In the case of integration of a sensor into the sensor channel, the sensor can preferably cover substantially or partially the entire cross-sectional area of the sensor channel. In this case, the sensor can preferably have an opening called aperture in particular. The sensor may preferably close off the channel, or it may allow an opening in the channel between the two chambers that is not covered by the sensor. It may preferably be substantially or partially materially sealed for the gas located in the chambers or substantially or partially permeable. In the case of permeability, it is particularly preferred that the permeability be such that pressure equalization can occur between the two chambers, but that the pressure equalization be sufficiently delayed with respect to the sound pressure waves to be detected in order to effectively detect the sound pressure waves. A person skilled in the art knows how to arrange, design and/or dimension an opening depending on the arrangement, the dimensioning of the chambers and/or the channel, the sensor used, the gas to be detected and/or other influencing variables in order to achieve the aforementioned objective.

Preferably, the gas sensor has a uniform surface facing the IR emitter, which extends over the entire lateral arrangement comprising the detection chamber, the sensor channel and the reference chamber. Preferably, the sensor channel is set back slightly from the IR emitter relative to the internal volumes comprising the chambers to minimize unwanted direct IR irradiation to the sensor located in the sensor channel.

Preferably, the detection chamber is located in the beam path of the infrared emitter. Preferably, this means that the intensity of the beam is substantially or at least partially incident on the side of the detection chamber facing the emitter. Partially preferably means at least 40%, preferably at least 50%, 60% or more. In particular, it means that the region of maximum intensity of the beam impinges on the detection chamber. Preferably, it means that the beam is focused and/or collimated such that a substantial portion of the intensity impinges on the side facing the emitter. A preferred example is a Gaussian beam, which in particular has a transverse profile according to a Gaussian curve. Along the beam, the line with the maximum intensity is preferably defined as the z-axis. The beam radius w at the "height" z of the beam is thereby preferably defined as the distance to the z-axis at which the intensity has fallen to $1/e^2$ (preferably about 13.5%). Following this definition, it is preferred that "the detection chamber is located in the path of the infrared emitter" means that substantially all of the beam radius is incident on the side of the detection chamber facing the emitter.

It may be preferred that the intensity of the beam is divided substantially equally between the detection chamber and the reference chamber. Preferably, however, the above definitions apply analogously for a beam that irradiates the detection chamber and the reference chamber in equal parts.

In particular, at least one chamber is illuminated with IR radiation such that a flow/pressure of the contained gas is created in a temporally modulated manner between the two chambers.

Preferably, the side of the detection chamber facing the emitter is transparent to the emitted IR radiation, so that the radiation essentially reaches the interior of the gas-fillable chamber. Preferably, the side of the detection chamber facing the IR emitter in particular is also referred to as the irradiated surface.

This can preferably apply analogously to the reference chamber.

The fact that the detection chamber is in the beam path of the infrared emitter means in particular that the infrared emitter can excite gas in the detection chamber to form sound pressure waves by means of modulably emittable infrared radiation, since the detection chamber is irradiated at least partially (preferably at least 40%, more preferably at least 50%, in particular at least 60%) and in particular a substantial portion of infrared radiation reaches the volume inside the gas-fillable detection chamber. A substantial portion means in particular at least 80%, more preferably 90% and in particular 95%.

Terms such as substantially, approximately, about, etc. preferably describe a tolerance range of less than ±20%, preferably less than ±10%, even more preferably less than ±5% and in particular less than ±1%. Indications of substantially, approximately, about, etc. always also disclose and include the exact value mentioned.

The sound pressure waves are preferably detectable by means of the sensor in the sensor channel. This means that the arrangement and realization of the MEMS sensor are preferably suitable for detecting the sound pressure waves or the equalization of sound pressure between the chambers. The sensor can, for example, be designed in the form of a microphone in the form of a membrane, which can be excited to oscillate by the sound pressure waves, whereby the oscillations can preferably be read out by a corresponding electrical, magnetic and/or electronic arrangement and/or control.

The sensor preferably refers to a sensor in the form of a microsystem (Micro-Electro-Mechanical System, abbreviated MEMS) and may therefore in preferred embodiments also be referred to as a MEMS sensor. A microsystem is in particular a miniaturized device, assembly and/or component, wherein the components have dimensions in the order of magnitude of about 1 micrometer (μm) or smaller and interact as a system. The MEMS sensor is, for example, a MEMS microphone.

In particular, the entire photoacoustic gas sensor can be realized as a MEMS. Advantageously, the sensor can be implemented or integrated directly in the MEMS. In this sense, a MEMS sensor preferably refers to a sensor or sensor element in the photoacoustic gas sensor implemented in MEMS.

Detection chamber, sensor channel, reference chamber and MEMS sensor are formed in particular in a multilayer substrate. Substrate refers in particular to the base material for manufacturing the respective components. In particular, the term is oriented to the semiconductor industry, in which circuits are manufactured from the substrate. In this context, materials and/or production techniques known from the semiconductor industry and/or MEMS production are used, which are suitable for the production of large quantities due to their efficiency, simplicity, low production costs and suitability.

In this context, a substrate can be machined and shaped in one piece as desired by etching processes and/or physical processing techniques, in particular by ablating and/or eliminating areas and/or layer thicknesses of the individual substrate. A multilayer substrate comprised in particular, multiple, preferably, 2, 3, 4, 5, 6, 7, 8, 9 or 10 layers or more of individual thin substrates, which can be individually machined and then assembled to form the gas sensor, in particular comprising the aforementioned components.

In particular, due to the aforementioned components being arranged adjacent to each other in a lateral plane, the respective layers of the components in the respective substrate layer can be fabricated very easily and/or substantially simultaneously. A gas sensor that is easy to manufacture with low height and high compatibility with other semiconductor elements such as electronic circuits can be manufactured. Only a few substrate layers are used. Advantageously, this can further reduce the number of components used. In particular, a monolithic chamber with integrated detector can be realized by a suitable joining of the substrate layers. Monolithic preferably means consisting of one piece, contiguous and/or jointless or inseparably assembled from very small components.

The compactness and compatibility of the gas sensor enables it to be used in a particularly wide range of applications. For example, installation in a smartphone or other devices that can be used by the end user is conceivable. The gas sensor can also be used, for example, for emissions monitoring and can be retrofitted very easily due to its dimensions. Retrofitting in sensitive public areas, such as train stations, airports, trains, etc. to avert the danger of a terrorist attack is also conceivable.

In a preferred embodiment of the invention, the reference chamber and the sensor channel with the sensor are not present in the beam path of the infrared emitter. This can be achieved in particular by arranging the detection chamber, sensor channel and reference chamber laterally to each other in a plane perpendicular to the direction of irradiation. This can be achieved by suitable dimensioning of the gas sensor, in particular of the irradiation area of the detection chamber and/or of the IR beam directed at the detection chamber.

Advantageously, a configuration can be achieved whereby sound pressure waves modulated by PAS are generated substantially only in the detection chamber. Thus, the measurement accuracy and sensitivity can be improved. In addition, any thermal influences that interfere with the measurement accuracy of the sensor can also preferably be minimized.

In another preferred embodiment of the invention, the multilayer substrate comprises at least two substrate layers selected from the group consisting of monocrystalline silicon, polysilicon, silicon dioxide, silicon carbide, silicon germanium, silicon nitride, nitride, germanium, carbon, gallium arsenide, gallium nitride, indium phosphide, and glass.

These materials are particularly easy and inexpensive to process in semiconductor and/or microsystem manufacturing and are also well suited for mass production. Likewise, these materials are particularly suitable for doping and/or coating in order to achieve the desired electrical, thermal and/or optical properties in certain areas. For example, the system wafer can be doped as low as possible for high IR transparency. In particular for the fabrication of a gas sensor from a multilayer substrate, preferably comprising MEMS elements, the aforementioned materials offer multiple advantages due to the usability of standardized fabrication techniques, which are also particularly suitable for the integration of further components, such as electronic circuits. In particular, the use of glass in at least one substrate layer is well suited for the realization of an irradiated surface of the detection chamber and/or the reference chamber.

In another preferred embodiment of the invention, the multilayer substrate is formed by bonding at least two wafers.

Wafer bonding preferably describes a process step in semiconductor and microsystem technology in which two wafers or slices, e.g. of silicon, quartz, glass and/or the aforementioned materials, are bonded together.

Preferably, different processes can be used for bonding:
  In direct bonding, especially of silicon wafers, hydrophilic and hydrophobic surfaces of the wafers are preferably brought into contact under high temperatures. Preferably, one wafer is pressed centrally against the other, advantageously creating a first contact point. This mechanical connection in the contact area is preferably based on hydrogen bonds and/or Van der Waals interactions. The contact area thus connected is preferably extended to the remaining wafer surface(s) by successively removing spacers initially present between these surfaces. The process temperatures are preferably between 1000° C. and 1200° C. and a pressure in the order of 10 megapascals (MPa) to 25 MPa, in particular about 18 MPa, is applied to the wafers. Direct bonding can preferably be used for joining two silicon and/or silicon dioxide wafers.
  In anodic bonding, a glass with an increased Na+ ion concentration (preferably positively charged sodium ions) is used, which is preferably brought into contact with a silicon wafer. An electrical voltage is applied, which is configured in particular to generate a negative polarity on the glass. Thus, preferably and in particular with the aid of an elevated process temperature, the sodium ions (Na+) diffuse to the electrode, whereby a depletion region is preferably formed at the interface, which causes an increase in the electric field and generates Si—O—Si bonds. These bonds preferably extend successively to the entire interconnect area between glass and silicon. In this way, glass and silicon wafers in particular can be bonded together. With appropriate adaptation of the process, bonding of two silicon layers and/or a silicon metal layer to a glass is also possible. Anodic bonding can preferably take place at temperatures of about 400° C., it can equally preferably take place at "low temperature" at about 180° C., preferably sparing the materials to be bonded. Preferably, various of the aforementioned materials can also be bonded.

Preferably, bonding processes with so-called intermediate layers between the wafers to be bonded can also be used, such as so-called eutectic bonding, which is preferably also based on bonding through a eutectic alloy as an intermediate layer, e.g. Si—Au (silicon gold) or Ge—Al (germanium aluminum). A eutectic alloy is preferably an alloy whose constituents are mixed in such a ratio to each other that at a certain temperature the whole alloy becomes liquid or solid. Eutectic bonding can be used, for example, to bond two silicon wafers. Preferably, however, other of the aforementioned materials can also be bonded.

Glass frit bonding is also preferably based on the use of an intermediate layer between the wafers to be bonded, with the bond formation being carried out in particular by melting glass solders/glass frits. Glass solder preferably comprises a glass which has a low softening temperature, for example about 400° C. Glass frit preferably comprises surface-melted glass powder, the glass grains of which preferably bake or sinter together at least partially. This type of bonding can preferably bond silicon and/or silicon dioxide wafers together, but preferably also other aforementioned materials.

Adhesive bonding preferably describes a bond formation by an intermediate layer comprising adhesive. Adhesive bonding preferably allows various of the aforementioned materials to be bonded together.

Preferably, selective bonding can be performed by photolithography, etching, and/or lift-off processes.

By bonding several layers of individually pre-processed substrates, complex components of gas sensors and, in particular, fully integrated, complete gas sensors can be easily manufactured.

The bonding of structures from pre-processed substrates allows the simple fabrication of complex structures, which could only be produced from a single wafer and/or substrate with great effort. The bonding of multilayer substrates can be used, for example, for the simple and efficient production of cavities or chambers of the gas sensor without having to intricately cut them out of the interior of a raw material.

The apparatus resulting from bonding the wafers is preferably also referred to as a wafer stack.

In another preferred embodiment of the invention, a lower system wafer comprises the sensor and at least two lower cavities, and an upper cap wafer has upper cavities complementary to the lower cavities, such that the reference chamber and detection chamber are formed by bonding the lower system wafer and the upper cap wafer.

The respective cavities of the two wafers to be bonded are in particular cavities closed on one side, which are in particular open on the side facing the other wafer in such a way that joining results in cavities which are substantially closed on all sides, wherein any openings for a gas exchange and/or the sensor channel can preferably exist. In particular, the cavity of the respective wafer comprises at least two recesses in the wafer on the side of the wafer which is to be joined to the other wafer. In this case, the cavities of both wafers are arranged in each case in such a way that they correspond to one another after joining, with one cavity of each of the one wafer and the other wafer forming a common cavity with one another within the composite structure.

The sensor is preferably contained between the cavities of the lower system wafer. This can preferably be formed in a joint structuring process with the formation of the cavities.

Preferably, the detection chamber and the reference chamber are formed by the two cavities per wafer after bonding of both wafers. Preferably, at least in one of the wafers a connecting cavity is arranged between the two cavities, which forms the sensor channel after bonding. Particularly preferably, both wafers have cavities corresponding to each other, which after assembly analogously form the sensor channel. This at least one cavity preferably has a smaller extension than the other two cavities with respect to the geometric dimensions, in particular with respect to the depth of the recess in the wafer.

Preferably, the sensor is mounted in the cavity for the sensor channel or corresponding to it on the system wafer so that it is present in the sensor channel after bonding.

However, it may also be preferred that a partition or separating membrane is formed on the system wafer during the structuring process, which separates a lower cavity of the system wafer from an upper cavity of the cover wafer. The separating membrane can preferably have one or more apertures which allow gas flow between the chambers obtained after bonding (see. FIG. 22). The components of the sensor, for example a heating element or a temperature sensor are preferably applied to the separating membrane itself are, as explained in detail below, preferably set up for measuring a gas flow through the aperture.

Preferably, (e.g. laterally derived) connection pads and/or lines for any electronics for reading the sensor may also be included. Likewise, a tunable IR filter can optionally be provided on the system wafer.

Preferably, the cap wafer can also be made of silicon, preferably transparent to an IR radiation, glass or even a metal.

The cap wafer can preferably have a printed circuit board (PCB) and/or a ceramic substructure, in particular comprising conductor traces. In this way, for example, electronic interconnection of the gas sensor and in particular of the sensor or the sensor itself can be implemented in a particularly easy and cost-saving manner.

A PCB is preferably a printed circuit board circuit board. This is preferably a carrier for electronic components, in particular surface mounted devices (SMDs) and/or integrated circuits, or can itself be a component of an integrated circuit.

A PCB may, for example, comprise electrically insulating material with conductive connections (conductor tracks) adhering thereto, in particular made of copper. The insulating material may include, for example, fiber-reinforced plastic, hard paper, Teflon, aluminum oxide, and/or ceramic.

A ceramic substructure comprises in particular a ceramic carrier material which is designed by structuring and/or equipping with further components, such as conductive traces, relating to a functionality. Ceramics or a ceramic material comprise in particular silicate, aluminum oxide, beryllium oxide, zirconium(IV) oxide, titanium(IV) oxide, silicon carbide, boron nitride, boron carbide, silicon nitride, aluminum nitride, molybdenum disilicide and/or tungsten carbide.

In this way, the gas sensor can be manufactured in a particularly simple, largely integrated manner and using as few and simple process steps as possible. First, system wafers and cap wafers are advantageously manufactured individually and then essentially only have to be joined together to form the gas sensor by bonding.

In another preferred embodiment of the invention, a lower system wafer comprises the sensor and at least two lower cavities, wherein the reference chamber and detection chamber are formed by bonding the lower system wafer and an upper cap wafer.

In this preferred embodiment, the chambers are formed in particular by the cavities of the system wafer, which are closed substantially from above by bonding the cap wafer.

This embodiment is particularly simple and cheap to manufacture.

In another preferred embodiment of the invention, a lower system wafer comprises the sensor and a lower cavity, and an upper cap wafer has two upper cavities complementary to the lower cavity, such that bonding of the lower system wafer and the upper cap wafer forms the reference chamber, the detection chamber, and the sensor channel.

In another preferred embodiment of the invention, the detector chamber and/or the reference chamber has a height of from 10 μm to 2 mm, preferably from 50 μm to 1 mm, more preferably from 100 μm to 500 μm.

Thus, a flat and compact design, in particular a low overall height of the gas sensor can be achieved. In particular, due to the laterally arranged design of the chambers, the overall height is not decisive for the quality and/or sensitivity of the measurement. In the case of chambers arranged in the beam direction (one above the other), it is advantageous to achieve a certain minimum construction height in order to minimize any undesirable influence of the IR radiation on the reference chamber and/or the sensor. Advantageously, this is not necessary with the lateral design.

In another preferred embodiment of the invention, the detector chamber and/or the reference chamber has a length or width of from 100 μm to 5 mm, preferably from 200 μm to 3 mm, more preferably from 500 μm to 2 mm.

Thus, at the same time a compact design is formed as well as sufficient volume for exciting detectable sound waves by PAS.

In another preferred embodiment of the invention, the sensor channel has a length of from 1 μm to 500 μm, preferably from 10 μm to 200 μm, more preferably from 10 μm to 100 μm.

In another preferred embodiment of the invention, the sensor channel has a cross-section of from 1 μm$^2$ (for example 1×1 μm$^2$) to 250 000 μm$^2$ (for example 500×500 μm$^2$), preferably, from 100 μm$^2$ (for example 10×10 μm$^2$) to 25 000 μm$^2$ (for example 50×50 μm$^2$).

Thus, the sensor channel arranged between the detection chamber and the reference chamber can achieve sufficient lateral separation of the two chambers while maintaining a compact design.

At the same time, it is particularly easy to arrange a sensor in the sensor channel.

In another preferred embodiment of the invention, the sensor is a sound pressure detector, wherein the sound pressure detector preferably comprises a piezoelectric, piezoresistive and/or magnetic cantilever and/or a capacitive, piezoelectric, piezoresistive and/or optical microphone.

The sound pressure waves generated by the PAS can preferably be detected in various ways. A sound pressure detector is a particularly suitable means. The sound pressure detector can in particular be a piezoelectric cantilever.

A piezoelectric cantilever is preferably a vibrating structure, in particular in the form of a bending cantilever, which comprises a piezoelectric material, e.g. in the form of an actuator.

It may be preferred that the bending cantilever is passive, which preferably means that it is caused to oscillate by the sound pressure waves. These in turn generate a voltage as a result of the deformation of the piezoelectric material, which is based on the piezoelectric effect. The (direct) piezoelectric effect preferably describes the occurrence of an electrical voltage and/or a change in impedance on a solid made of corresponding material when it is elastically deformed. The voltage can be tapped, for example, by suitable contacting and read out by a corresponding electronic circuit.

It may also be preferred that the bending cantilever is active, which means in particular that it is caused to oscillate due to the inverse piezoelectric effect. The piezoelectric effect preferably describes the deformation of a material when an electrical voltage and/or an electrical field is applied, whereby a force can be exerted in particular by the material. The sound pressure waves can preferably cause a variation in the attenuation of the vibrating cantilever, which can be measured, e.g. by a change in the resonant frequency of the vibrating cantilever.

A cantilever that vibrates passively due to sound pressure waves can preferably also be read out, e.g. by capacitive, magnetic and/or piezoresistive methods. The idea is preferably also that an electrically readable change is generated by the vibration, e.g. based on a changing magnetic flux through a resonating magnet, by a changing capacitance between a vibrating and a fixed electrode and/or by a changing electrical resistance in a piezoresistive material.

A microphone preferably comprises a vibrationally mounted membrane which is excited to vibrate by sound pressure waves, which in turn can be read out electrically, similar to the cantilever described above. Capacitive, piezoelectric and/or piezoresistive measurement methods of the vibration design can also be used.

Preferably, an optical microphone can also be used, whereby these vibrations can preferably be converted into an optical signal by reflection, e.g. of a laser beam on the membrane, which is read out, e.g. in an interferometric arrangement.

In another preferred embodiment of the invention, the sensor, preferably the MEMS sensor is a capacitive microphone, comprising a MEMS membrane as electrode as well as a counter electrode and wherein the MEMS membrane preferably has a maximum extension in at least one direction of 100 μm to 1500 μm, in particular 200 to 1000 μm. This embodiment represents an ideal combination of compactness and sensitivity of the sensor.

Preferably, the membrane of the microphone, in particular the MEMS membrane, has a small opening, which is preferably called an aperture. In particular, if the (MEMS) membrane comprises the entire cross-section of the sensor channel and thus represents a separating element in the sensor channel between the detection chamber and the reference chamber, which are in particular pressure-tight, an aperture or ventilation hole can preferably be included for pressure equalization. Thus, among other things, the longevity of the membrane can be increased.

In another preferred embodiment of the invention, the sensor is a flow sensor, preferably a thermal flow sensor, a hot-wire anemometer, a thermoelectric anemometer, and/or a resistive anemometer.

Instead of a sound pressure detector, gas flows in the sensor channel caused by pressure differences can also be detected by a flow sensor. A flow sensor is preferably a sensor which can measure the flow of a gas through a channel, a pipe and/or a tube. This is preferably the sensor channel. In this embodiment, it is particularly preferred that there is an aperture between the detection chamber and the reference chamber so that there is a flow in the sensor channel which can be measured.

A thermal flow sensor is preferably based on the principle that heat is extracted from a heated element, e.g. a heating wire, as a function of the flow velocity of a gas. The person skilled in the art knows how to thus deduce from the measurable flow velocity the sound pressure variations generated in a PAS and finally a gas concentration.

An anemometer is preferably referred to as a device for locally measuring the velocity of a flow field of a fluid.

A hot-wire anemometer preferably uses a current-carrying sensor surface and/or a wire as a probe and heats it electrically. The materials used preferably have a temperature-dependent resistance, which increases in particular with increasing temperature. The electrically supplied heat power is partly carried away by the flow of the fluid as a function of its velocity as heat loss power. Preferably, the heating current can be kept constant and the voltage drop across the resistor measured. The measured voltage is then preferably proportional to the temperature of the probe, whereby with increasing flow velocity the probe cools down further and the measured voltage preferably decreases.

It is also possible to preferably keep the temperature constant, with the current for heating varying according to the cooling by the flowing gas.

A thermoelectric anemometer and/or a resistive anemometer may also preferably be used. An ultrasonic anemometer may also be suitable. In this case, ultrasonic waves are carried along by the gas in which they propagate, so that the transit time of signals over a measuring path of fixed length depends on the flow through the measuring path. Preferably, the length of the sensor channel corresponds to the measuring path between the ultrasonic transmitter and an ultrasonic sensor, so that the flow between the detection and reference chambers can be precisely determined.

Preferably, a thermopile can also be used. This is preferably an electrical component through which thermal energy can be converted into electrical energy. The thermopile can be used, for example, when using a hot-wire anemometer which is to be kept at a constant temperature.

Due to the preferred absence of mechanical components, sensors of this embodiment can be manufactured in a particularly simple and compact manner and are also very robust.

In another preferred embodiment of the invention, the flow sensor is present in the sensor channel and forms an aperture which preferably has a maximum extension in at least one direction of from 100 µm to 1500 µm, in particular from 200 µm to 1000 µm.

The size of the aperture or ventilation hole can advantageously be used to adjust the sensitivity and/or dynamics of the gas sensor. This preferably depends on the absolute size of the aperture. In some cases, this also preferably depends on the relative size compared to the dimensions of the sensor channel, in particular the cross-section of the sensor channel. The aforementioned sizes of the aperture have proven to be particularly advantageous, especially for the dimensions mentioned in this document.

The aperture thereby preferably comprises the components of the sensor, e.g. the heating element and the thermopile, e.g. in an edge region of the aperture and or as elements which form the aperture by their outer dimensions.

In another preferred embodiment, the detection chamber and the reference chamber are at least partially separated by a partition comprising at least one aperture forming the sensor channel and wherein the sensor is at least partially arranged on the partition and is adapted to measure a gas flow between the detection chamber and reference chamber through the at least one aperture.

Preferably, the partition is a membrane. Preferably, gas flow between the detection chamber and the reference chamber is enabled exclusively by the at least one aperture within the partition. The remaining areas of the partition, on the other hand, are preferably gas-tight.

In the preferred embodiment, the aperture in the partition or separating membrane thus preferably forms a sensor channel within the meaning of the invention, which connects the detection chamber and reference chamber. For the purpose of measuring a gas flow through the aperture, the sensor is preferably located adjacent to or near the aperture or the sensor channel at least partially installed on the partition.

Adjacent or near preferably means a distance of at least one element of the sensor of less than 20 µm, preferably less than 10 µm, less than 5 µm to the edge of the aperture. The local proximity of the sensor to the aperture preferably allows the measurement of at least one physical parameter by the sensor which changes due to a gas flow through the aperture.

In preferred embodiments, the measuring principle of the sensor is based on a modulation of a temperature and/or a heat flow in a region of the partition surrounding the aperture.

In a preferred embodiment, the sensor comprises at least one heating element and at least one temperature sensor, which are installed on the partition such that the at least one aperture is located between the heating element and the at least one temperature sensor, so that a gas flow between the detection chamber and the reference chamber can be measured through the at least one aperture based on a modulation of a heat flow between the heating element and the at least one temperature sensor.

The heating element can be a heating resistor, for example, which converts electrical energy into heat. The heating element is preferably controlled to a temperature that is higher than the ambient temperature. Heat is transported to the temperature sensor via both the partition and the aperture.

Advantageously, the heat transport is directly modulated by the gas flow. Thus, the temperature drop strongly depends on the speed at which gas flows through the aperture. The effect is independent of whether a directional or alternating gas flow occurs. In any case, the gas flow effectively reduces the heat transport so that an increased temperature drop is measurable (see FIG. 18).

The modulation of the heat flow along the partition or aperture can be measured, for example, as a differential temperature between a temperature $T_1$ in the immediate vicinity of the aperture and a reference temperature $T_0$ at a greater distance from the aperture. The temperature measurement can be made in various ways, both thermally and thermoelectrically, and directly reflects the modulation of heat transport by the gas flow.

A particularly preferred temperature sensor is a thermopile. A thermopile preferably has several serial (in series) or parallel thermocouples.

Thermopiles are preferably based on the principle of the thermoelectric effect. According to this, a voltage is generated when dissimilar metals (thermocouples) of the thermopile are exposed to a temperature difference.

The thermocouples preferably measure the temperature difference from their junction point to that point where an output voltage of the thermocouple is measured. As soon as a closed circuit includes different metals and there is a temperature difference between the junction points and the points of transition from one metal to the other, a current is generated, analogous to a potential difference between the hot and cold junction.

Thermocouples can be connected in series as thermocouple pairs, which increases the size of the voltage output. Thermopiles thus preferably do not react to the absolute (ambient) temperature, but generate an output voltage which is proportional and thus very sensitive to a local temperature difference or a temperature gradient.

In case of implementation of a thermopile, the thermopile is preferably installed in such a way that the hot junction is on a side facing the aperture, while the cold junction is on a side facing away from the aperture.

The output signal of the thermopile is advantageously extremely sensitive with respect to temperature differences between these two points. The modulation of the heat transport from the heating element, preferably to the hot junction of a thermopile, can thus be measured quickly and reliably.

In a further preferred embodiment, the sensor comprises at least one heating element, which has at least one opening corresponding to the at least one aperture and is installed on the partition, and wherein a gas flow between the detection chamber and the reference chamber through the at least one aperture and the corresponding opening of the heating element can be measured on the basis of a cooling of the heating element.

The heating element can, for example, be designed as a flat heating resistor (pad) and comprise a plurality of openings that correspond to apertures in an underlying partition. Corresponding preferably means that the openings and apertures are arranged to fit exactly (preferably congruently and centered) to each other, so that one opening and aperture respectively form one (sensor) channel.

A gas flow through the aperture(s) directly causes a cooling of the heating element itself, which can be measured for example by means of a temperature sensor (e.g. thermal or thermoelectric).

In a preferred embodiment, the partition or separating membrane of the photoacoustic gas sensor has at least 2, 3, 4, 5, 6, 7, 8, 9, 10 or more apertures.

In the case of the above-described measurement of gas flow through the apertures based on cooling of the heating element, providing a plurality of apertures can advantageously enhance the cooling effect and further improve the signal-to-noise ratio.

Also, for a measurement principle based on detecting the modulation of a heat flux due to the gas flow, providing a variety of apertures can lead to more accurate measurement results.

As illustrated in FIG. 22, it may be preferable, for example, to install a central heating element on a separating membrane, to which a plurality of apertures are provided on both sides. Each aperture can be associated with a temperature sensor, preferably a thermopile, which detects a modulation of the heat flow from the heating element to the temperature sensor in case of a PAS signal.

The detectable output signal is advantageously based on a large number of thermocouples or thermopiles, allowing even more sensitive measurements.

In addition to the number of apertures, the dimensioning of the aperture can also be optimized to improve the detection quality.

In a preferred embodiment, the at least one aperture has a cross-sectional area between 1 $\mu m^2$ and 10 000 $\mu m^2$, preferably 5 $\mu m^2$ and 1000 $\mu m^2$, particularly preferably 10 $\mu m^2$ and 100 $\mu m^2$.

Advantageously, the choice of the preferred cross-sectional area of the aperture ensures that even with very low PAS signals, the flow velocities occurring through the aperture are sufficiently high to be reliably detected. On the other hand, the apertures are not so small that they lead to a strongly increased sound resistance, which reduces the dynamic resolution of the sensor.

The possible implementation of the aforementioned apertures within the scope of manufacturing the photoacoustic gas sensor in MEMS technology thus allows both high sensitivity and further miniaturization.

The thermal resistance of the membrane or the heat capacity of the hot junctions of a temperature sensor can be additionally optimized to ensure a particularly high signal-to-noise ratio for the detection of the PAS signals.

In another preferred embodiment of the invention, the detector chamber, the sensor channel and the reference chamber form a closed system which is filled with a reference gas and wherein a gas to be analyzed is present in the optical path between the infrared emitter and the detection chamber, so that the proportion of the reference gas in the gas to be analyzed can be measured on the basis of the formation of sound pressure waves in the detection chamber.

The detection chamber preferably contains a reference gas which is matched to the IR emitter in such a way that modulated IR radiation penetrating the detection chamber enables PAS with the aid of the gas therein. If the measurement path between the infrared emitter and the detection chamber also contains a gas that absorbs the IR radiation (in particular the reference gas) and PAS takes place, then the strength of the absorption in the detection chamber is reduced. By the magnitude of the reduction, it is possible to infer the concentration of the gas in the measurement section. Preferably, the smaller the formation of sound pressure waves in the detection chamber, the more of the reference gas is present in the beam path outside the detection chamber, since absorption and excitation then already take place there in particular. Preferably, a narrow-band IR emitter is used here so that, if possible, only the reference gas can be excited.

For example, the detector and reference chambers can be closed and filled with a reference gas (mixture), e.g. $CO_2$ in N2. If the $CO_2$ content in the surrounding air is to be measured, the IR emitter, which preferably emits broadband light, is spaced apart from the lateral cell. At this distance, the modulated IR light passes through the surrounding air (measurement path or "gas under test") and only then enters the detector chamber. According to the concentration of $CO_2$ in the air, the radiation is absorbed in the wavelength of $CO_2$ and this energy is missing when the residual IR radiation enters the detector chamber. Therein, the remaining IR radiation is absorbed in the reference gas (mixture) and leads to a sound pressure event, which is equalized via sensor channel into the reference chamber as described, where the sensor can measure the pressure equalization as a PAS signal.

This measurement method is particularly sensitive for measuring a proportion of a previously determined gas. In this case, a small free-space between the IR emitter and the detection chamber may be sufficient. Thus, a compact gas sensor can be provided very easily, which can measure a concentration of a certain gas in the surrounding environment of the gas sensor.

In another preferred embodiment of the invention, the detection chamber represents an open system having one or more openings such that a gas to be analyzed can flow or diffuse into the detection chamber.

For example, the detector and reference chambers communicate with the gas mixture to be analyzed (e.g., air) via openings. The openings can preferably be small enough to ensure that the acoustic ventilation frequency is below the measurement frequency. Alternatively, the openings may preferably be closable with valves, selectively opened to admit the analyzing gas mixture, and closed for measurement. Preferably, the IR emitter radiates in a modulated and wavelength-selective manner into the reference chamber. For example, if a gas component (e.g. $CO_2$ concentration) is to be determined in this gas mixture, preferably it is excited at the specific wavelength for the gas component (e.g. $CO_2$). This results in a sound pulse or a sound pressure wave proportional to the concentration of this gas component in the gas mixture. The sound pressure drops through the sensor channel or aperture into the reference chamber. By means of the sensor or sensor element located in or adjacent to the sensor channel, the pressure balance can be measured as described.

The openings are preferably large enough to have suitable flow resistance for diffusion and/or not to prevent the buildup of a sound pressure wave in the detection chamber. For manufacturing reasons, a cross-section resulting from an etching process is preferred. In wet chemical etching (e.g., with potassium hydroxide—KOH), there is preferably a dependence on crystal direction; in dry etching, a substantially square cross-section may be preferred.

In another preferred embodiment of the invention, the detection chambers have two or more apertures with a maximum extension in at least one direction of 1 nm to 500 µm.

These sizes have proven to be particularly suitable for a compact gas sensor.

In another preferred embodiment of the invention, the infrared emitter allows wavelength-selective radiation and/or a wavelength-selective filter, for example a Fabry-Perot filter, is present in the optical path between the infrared emitter and the detection chamber.

The wavelength-selective filter is preferably tunable. Thus, the gas sensor can be used to determine the presence and/or concentration of different gases which can be excited to PAS at different wavelengths.

For example, a wavelength-sensitive infrared emitter may be a tunable laser and/or include multiple lasers of different wavelengths.

When using a tunable filter, a broad-spectrum IR emitter can be used in particular, such as an LED and/or a thermal emitter.

In a further aspect, the invention relates to a method of making a photoacoustic gas sensor according to any one of the preceding claims comprising the steps of
  providing at least two substrate layers
  depositing at least one layer of a conductive material on a first substrate layer and/or structuring a conductive material on the first substrate layer to form a MEMS sensor
  etching cavities in the first and/or second substrate layer
  bonding the first substrate layer to the second substrate layer to form the detection chamber, the reference chamber, and the sensor channel, wherein the sensor channel connects the detection chamber to the reference chamber and the sensor is integrated in or adjacent to the sensor channel.

The average person skilled in the art will recognize that technical features, definitions and advantages of preferred embodiments of the photoacoustic gas sensor according to the invention also apply to the manufacturing process according to the invention.

Application of at least one layer of a conductive material preferably comprises, in addition to the application of one layer, the application of multiple layers and, in particular, of a layer system. A layer system comprises at least two layers applied in a planned manner to one another.

The application of a layer or layer system preferably serves to define the sensor on the first substrate layer.

For example, an application comprises a deposition, e.g., in the case of a substrate made of polysilicon.

The etching of cavities can preferably be carried out in one substrate layer, with the cavities being substantially closed to the chambers only by the other layer, in particular the cap wafer. This is particularly advantageous for simple and cost-effective manufacturing. In particular, a PCB or ceramic with conductive traces can be used as the second layer or cap wafer.

In a preferred embodiment of the invention
  etching and/or structuring is selected from the group comprising dry etching, wet chemical etching and/or plasma etching, in particular reactive ion etching, reactive ion deep etching (Bosch process);
  deposition is selected from the group comprising physical vapor deposition (PVD), in particular thermal evaporation, laser evaporation, arc evaporation, molecular beam epitaxy, sputtering, chemical vapor deposition (CVD) and/or atomic layer deposition (ALD) and/or
  bonding the substrate layers is selected from the group comprising wafer bonding, direct bonding, surface activated bonding, plasma activated bonding, anodic bonding, eutectic bonding, weld bonding, glass frit bonding and/or adhesive bonding.

Surface-activated bonding and/or plasma-activated bonding particularly refer to a pretreatment of the wafer surfaces and/or activation of the bonding process by appropriate processes, e.g. plasma pretreatment. Low bonding times and/or high mechanical strengths can be achieved.

In a further aspect, the invention relates to a method for analyzing gas, comprising
  a. provision of a photoacoustic gas sensor for analyzing gas according to any one of the preceding claims.
  b. provision of a gas to be analyzed in the beam path between the infrared emitter and the detection chamber or within the detection chamber
  c. irradiation of the gas to be analyzed and the detection chamber with infrared radiation modulated with a modulation frequency to generate sound pressure waves
  d. measurement of the generated sound pressure waves by means of the sensor
  e. characterization of the gas to be analyzed based on the measurement results.

The average person skilled in the art will recognize that technical features, definitions and advantages of preferred embodiments of the photoacoustic gas sensor according to the invention also apply to the method for analyzing gas according to the invention.

DETAILED DESCRIPTION

In the following, the invention will be explained in more detail by means of examples, without being limited to them.

SHORT DESCRIPTION OF IMAGES

FIG. 1 Schematic representation of the gas sensor.
FIG. 2 Gas sensor with free-beam measuring section.
FIG. 3 Gas sensor with opening in detection chamber.
FIG. 4 Gas sensor with flow sensor.
FIG. 5 Gas sensor with capacitive microphone.
FIG. 6 Gas sensor fabricated from two bonded wafer layers.
FIG. 7-17 Different manufacturing steps of a gas sensor from two wafer layers.
FIG. 18. (a) a preferred embodiment of a sensor for measuring a PAS signal based on a gas flow between the detection chamber 3 and the reference chamber 5 through the aperture 18 of a partition 44. (b) Temperature along the membrane partition.
FIG. 19-22 Preferred embodiment of a sensor for measuring a PAS signal based on a gas flow between detection chamber and reference chamber through the aperture of a partition.

DETAILED DESCRIPTION OF THE ILLUSTRATIONS

FIG. 1 shows the gas sensor 1 with the detection chamber 3, the reference chamber 5 and the sensor channel 7 connecting both chambers. The IR emitter 9 is located in front of the detection chamber 3. Detection chamber 3 and reference chamber 5 are arranged laterally to each other in a (lateral) plane which is perpendicular to the radiation 11 of the IR emitter 9. Detection chamber 3 and reference chamber 5 are connected by a sensor channel 7 preferably running in the lateral plane. The radiation 11 of the IR emitter 9 thereby penetrates into the detector chamber 3 and can generate a modulation of the sound pressure there by PAS if a corresponding gas is present.

Since otherwise the same pressure conditions exist between the reference chamber 5 and the detection chamber 3, resulting sound pressure waves due to PAS are equalized via the sensor channel 7, wherein the sensor (not shown) is present therein for their detection.

FIG. 2 shows a free-beam measurement path 13 between IR emitter 9 and detection chamber 3. The detection chamber 3 preferably contains a reference gas which is matched to the IR emitter 9 in such a way that modulated IR radiation 11 penetrating the detection chamber 3 enables PAS with the aid of the gas there. If the measurement path 13 now also contains a gas that absorbs the IR radiation 11 (in particular the reference gas) and PAS takes place, then the strength of the absorption in the detection chamber 3 is reduced. The magnitude of the reduction can be used to infer the concentration of the gas in the measurement path 13. Preferably, a narrow-band IR emitter 9 is used here so that, if possible, only the reference gas can be excited.

FIG. 3 shows a detector chamber 3 with an opening 15 such that a gas surrounding the gas sensor can enter the detector chamber 3 and therein be excited as part of PAS. This allows the presence of that gas to be detected. This is based in particular on the fact that each gas can only be absorbed and thus excited at at least one specific wavelength. Preferably, a broadband IR emitter 9 is tuned, e.g. via a filter 16, so that the respective wavelength of the IR radiation 11 is known and an excitation detected by the sensor can thus be assigned to a specific gas.

FIG. 4 shows in particular a sensor in the form of a flow sensor 17 (hot-wire anemometer), which is present in the sensor channel 7. Around the sensor is an aperture 18 such that the gas can flow through the sensor channel 7. The velocity of the flow is preferably varied when PAS takes place and can thus be detected.

FIG. 5 shows a sensor in the form of a capacitive microphone 19 comprising a MEMS membrane 20. The MEMS membrane has an aperture 18 for pressure equalization. Thus, the longevity of the membrane can be increased. The membrane 20 preferably also functions as an electrode, such that vibrations of the membrane caused by sound pressure waves can be made measurable with the aid of the (MEMS) counter electrode 22.

FIG. 6 shows a gas sensor 1 fabricated from two bonded wafer layers. The lower system wafer 21 (gray) contains cavities and the sensing element. There may also be laterally derived connection pads for any electronics to read the sensor as well as optional tunable IR filters on the underside. The wafer is doped as low as possible for high IR transparency. The cap wafer 23 (green) contains complementary cavities and optional openings in the cap (base) for a possible gas exchange with the ambient atmosphere of the gas sensor. Both wafers are preferably bonded to each other using wafer bonding technology (hermetically if necessary).

FIG. 7 shows a starting substrate for a system wafer 25, which may consist of a SOI (silicon-on-insulator) wafer/substrate or a polysilicon on oxide wafer/substrate.

FIG. 8 shows a first structuring of the substrate surface, e.g. by dry etching.

FIG. 9 shows the covering of the wafer by a thin oxide layer 27.

Figure 1:
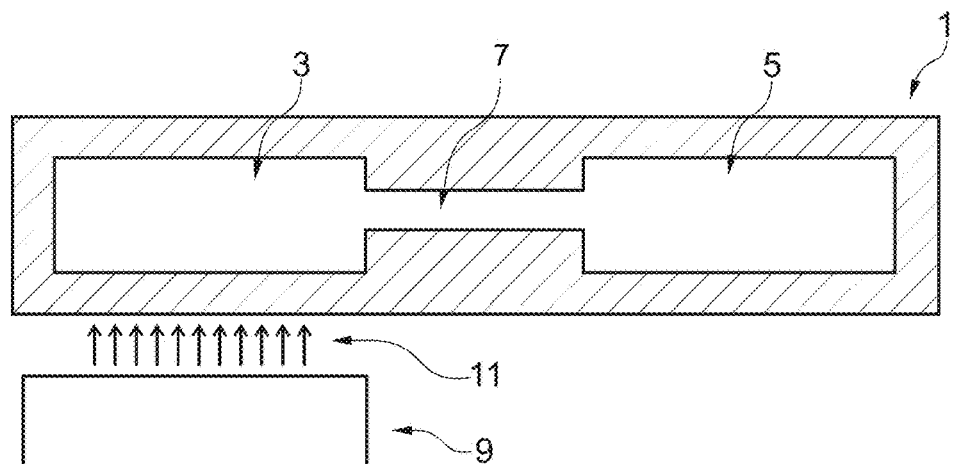
Figure 2:
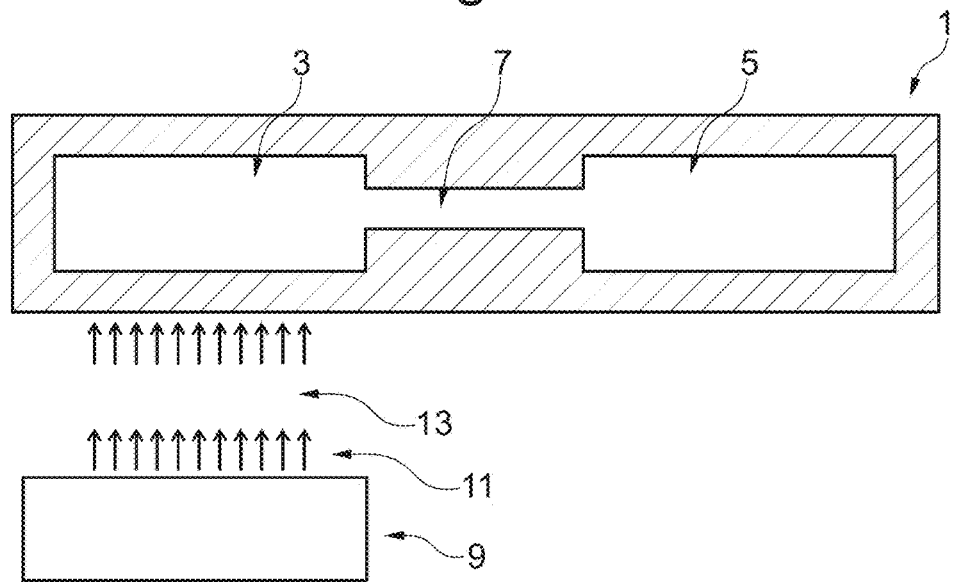
Figure 3:
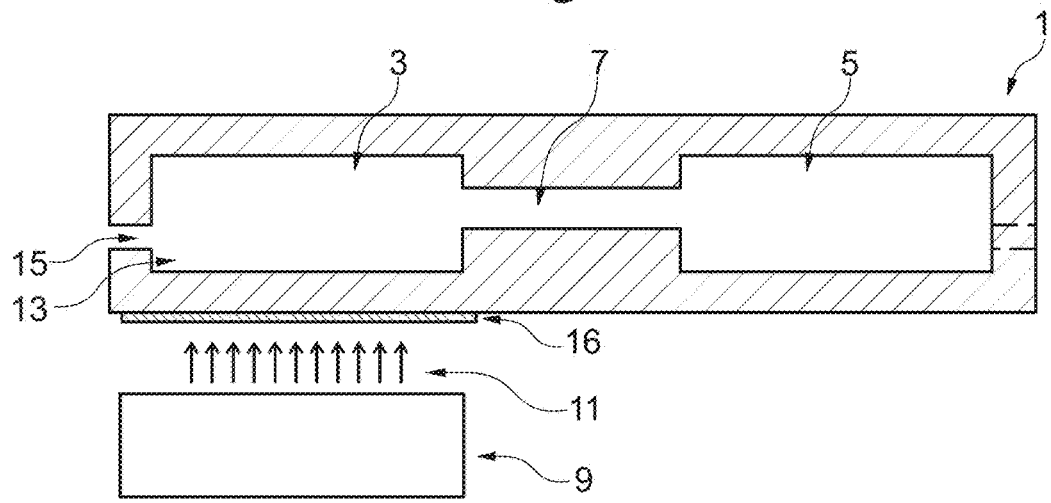
Figure 4:
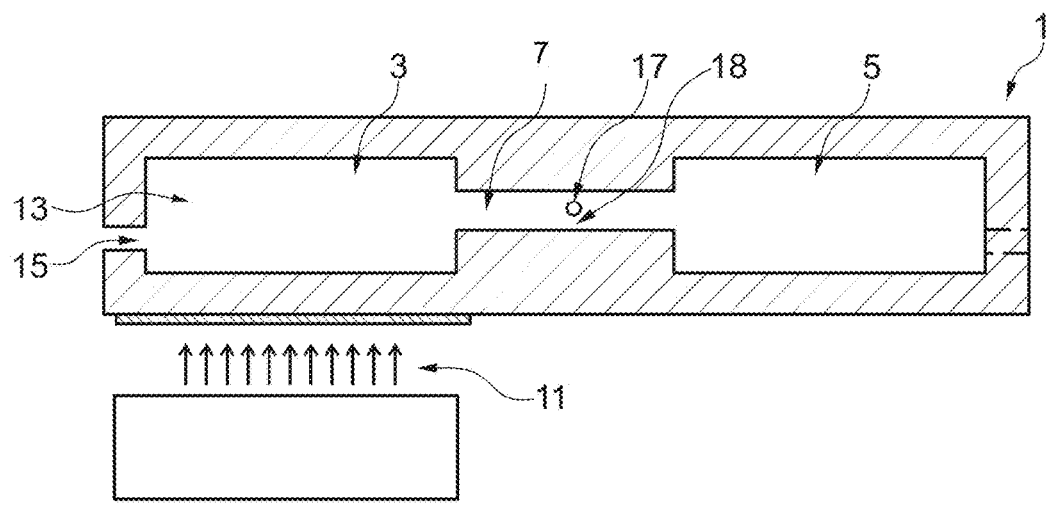
Figure 5:
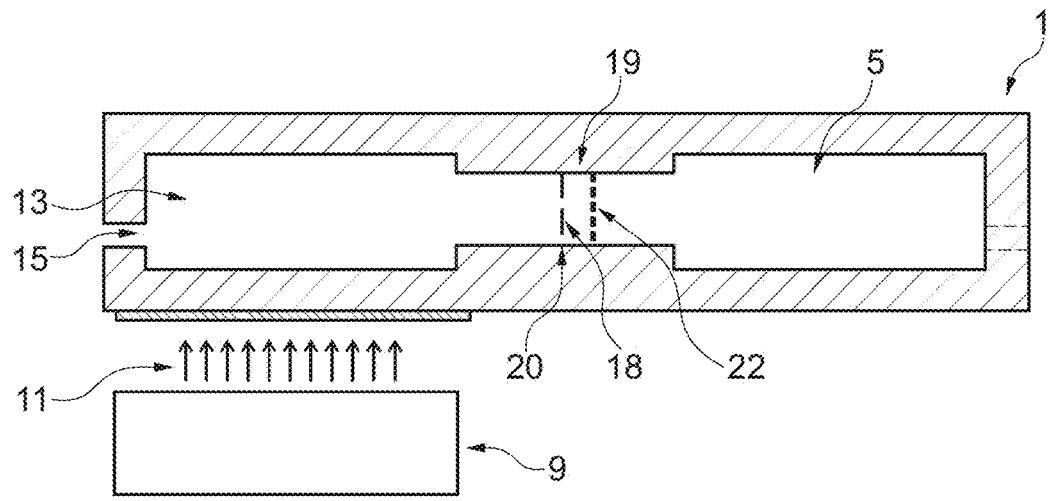
Figure 6:
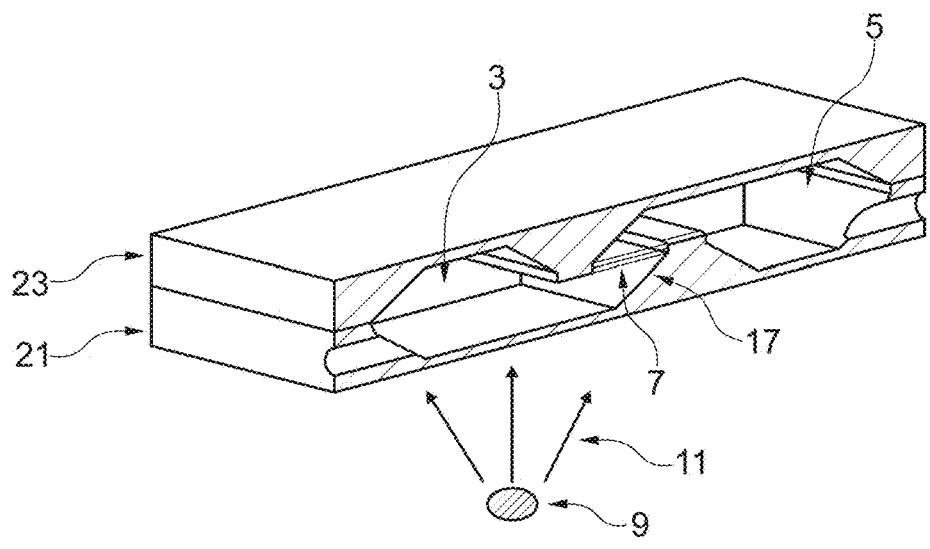
Figure 7:
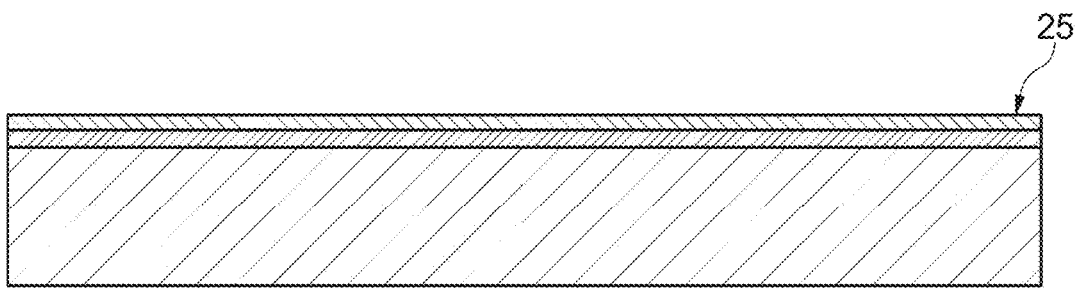
FIGS. 7-17 show different fabrication steps of a gas sensor from two wafer layers.
Figure 8:
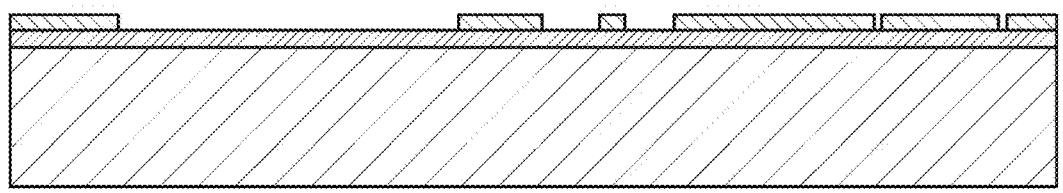
Figure 9:
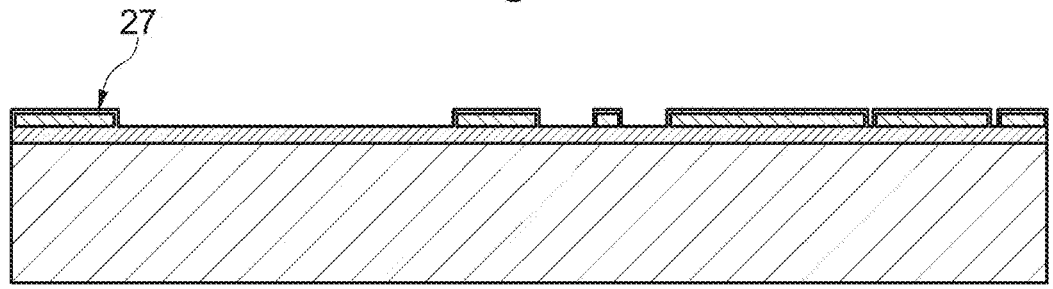
Figure 10:
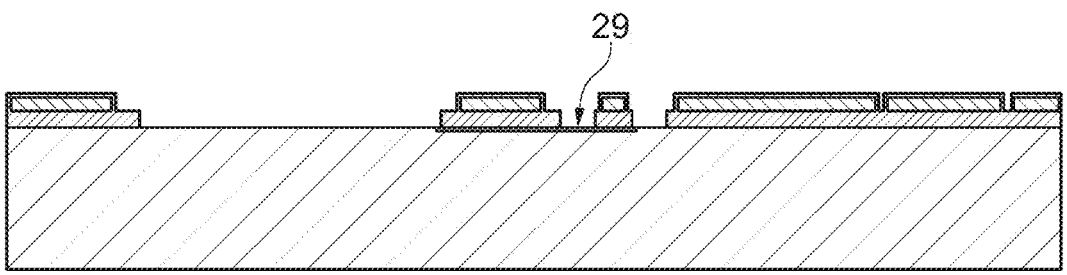

In FIG. 10, a hard mask is prepared for a wet etching process. Certain design rules are observed to achieve the desired structures. For example, a thin polysilicon layer 29 can be used to influence the etching process.

Figure 11:
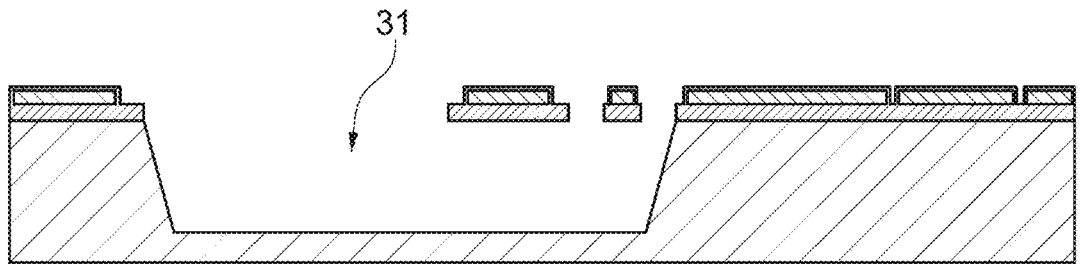

FIG. 11 shows the resulting structure comprising a cavity 31 and centered structures for the sensor.

Figure 12:
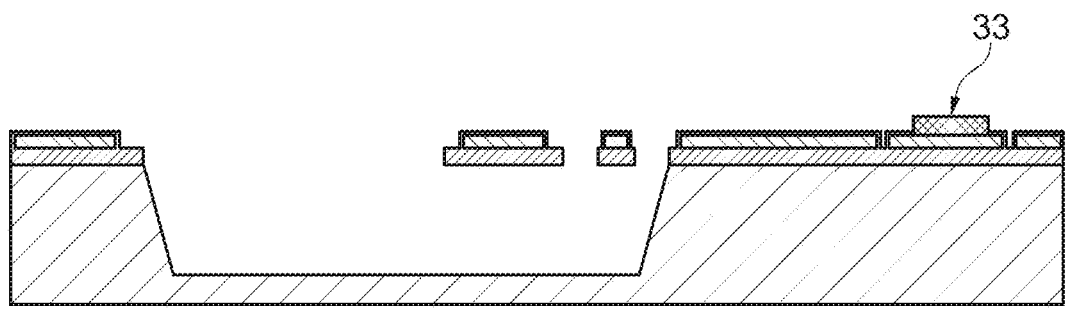

FIG. 12 shows applied through-hole plating 33 for the electrics and electronics and/or conductor traces. These may comprise metal and/or SOI or polysilicon, for example.

Figure 13:
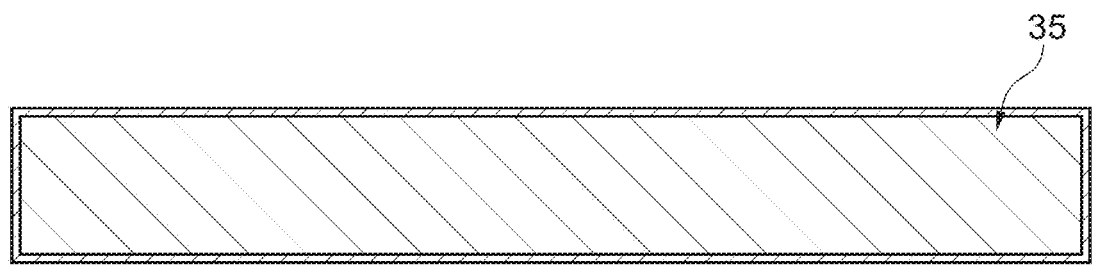

FIG. 13 shows a substrate for the cap wafer 35, which is surrounded by an oxide layer.

Figure 14:
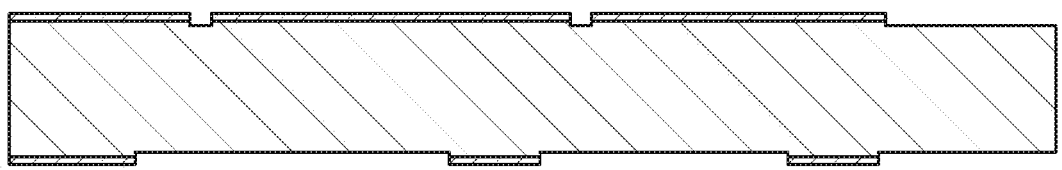
Figure 14:
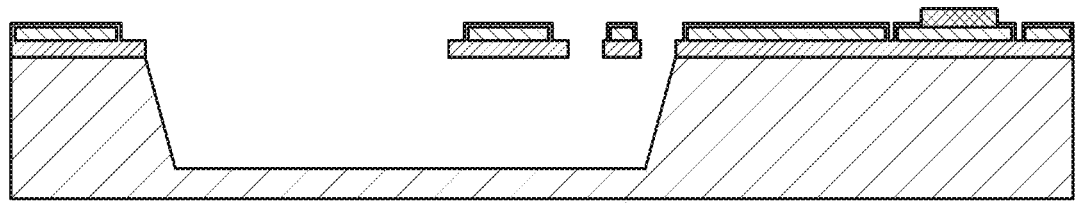

In FIG. 14, this cap wafer is also pre-structured for wet chemical etching by selectively removing the oxide layer in some areas.

Figure 15:
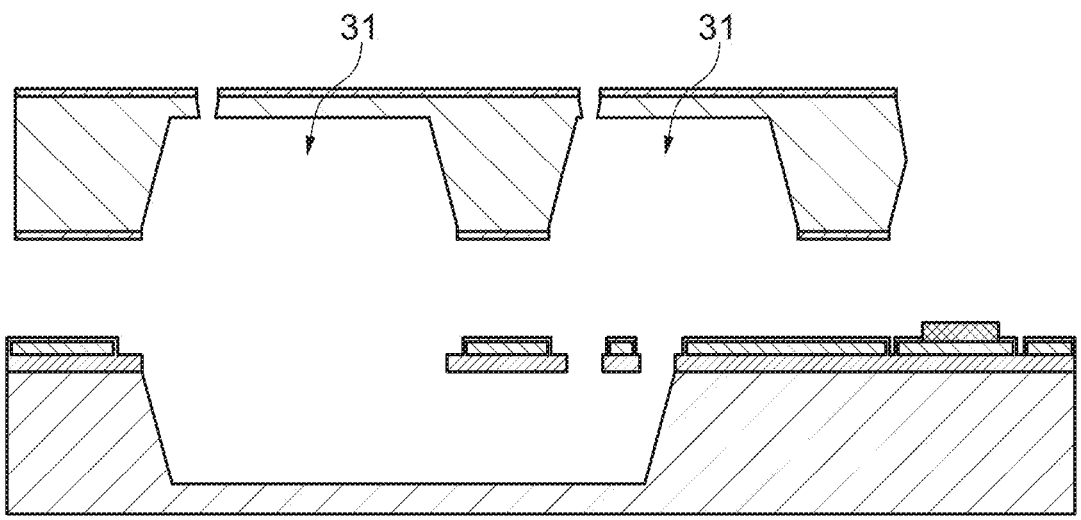

FIG. 15 shows the etched cap wafer comprising two cavities 31, which together with the one lower cavity can form detection and reference chambers. This corresponds to the preferred embodiment in which a lower system wafer comprises the sensor and a lower cavity, and an upper cap wafer comprises two upper cavities complementary to the lower cavity, so that the reference chamber, the detection chamber and the sensor channel are formed by bonding the lower system wafer and the upper cap wafer.

Figure 16:
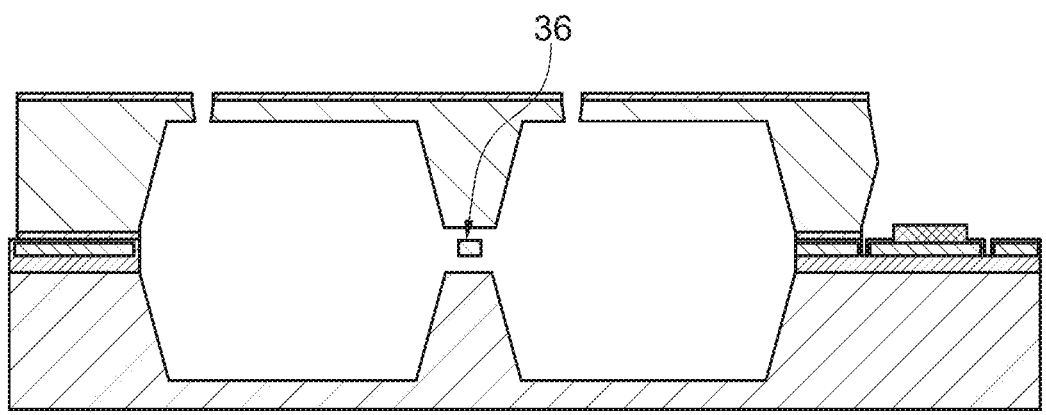

FIG. 16 shows the assembled wafers, whereby the system wafer is now structured differently and has two cavities corresponding to the cavities of the cap wafer. A heating wire for an anemometer 36 is integrated in the sensor channel.

Figure 17:
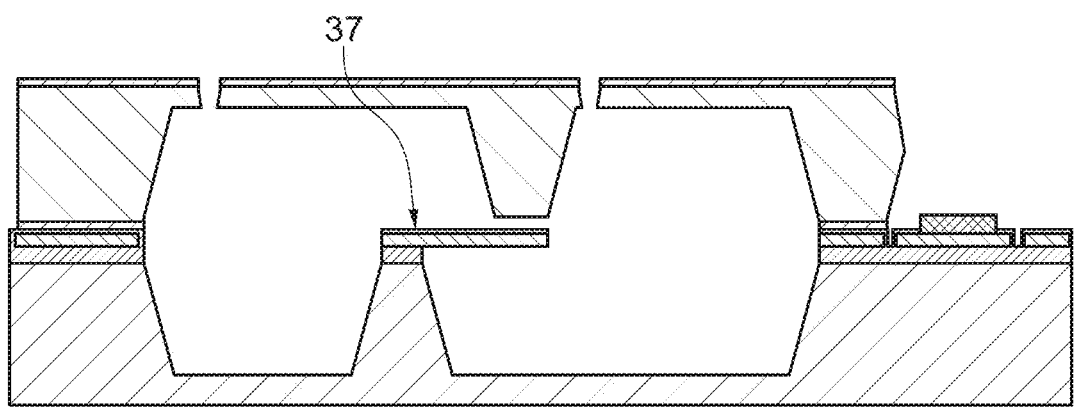

FIG. 17, on the other hand, shows an integrated piezoelectric bending cantilever 37 as a sensor.

FIGS. 7 to 17 thus illustrate the simple construction method, which is carried out using classic MEMS or semiconductor manufacturing technology.

FIGS. 18a, b illustrate a preferred embodiment of a sensor for measuring a PAS signal based on a gas flow between the detection chamber 3 and the reference chamber 5 through the aperture 18 of a partition 44.

Preferably, a gas flow between the detection chamber 3 and the reference chamber 5 is enabled exclusively by the at least one aperture 18 within the partition 44. The remaining areas of the partition 44, on the other hand, seal the gas volumes of the detection chamber 3 and reference chamber 5 from each other in a gas-tight manner. The partition 44 is preferably a membrane.

In the preferred embodiment, the aperture 18 in the partition 44 thus forms a sensor channel 7 connecting the detection chamber 3 and reference chamber 5. The sensor is designed to measure a gas flow between the detection chamber 3 and the reference chamber 5 through the at least one aperture 18 and is installed for this purpose at least partially on the partition 44 adjacent to the aperture 18 and/or the sensor channel.

The sensor comprises a heating element 40, for example a heating resistor, and a temperature sensor 42, which can be designed, for example, as a thermopile with a plurality of thermocouples in series or in parallel.

The heating element 40 can be controlled to an increased temperature $T_2$ compared to the ambient temperature. Heat is transported to the temperature sensor 42 via both the partition 44 and the aperture 18.

FIG. 18b shows a schematic illustration of the temperature curve. Along the partition 38 or membrane, the temperature drops over the area of the aperture 18 and the temperature sensor 42.

Advantageously, the temperature drop is strongly dependent on a gas flow passing through the aperture 18. As illustrated in the figure, the gas flow can occur equally in both directions 18. In particular, in the case of photoacoustic excitation of the gas molecules in one of the chambers, a ventilating gas flow through the aperture 18 occurs over the period of the PAS signal. The photoacoustic effect can be directly demonstrated by the modulation of heat transport. As illustrated in FIG. 18b, the heat transport is reduced by a gas flow (V>0) and a stronger temperature drop occurs in the region of the aperture than would be the case without gas flow (V=0).

The modulation of the heat flow along the partition 38 can be measured, for example, as a differential temperature between a temperature $T_1$ in close proximity to the aperture and a reference temperature $T_0$ at a greater distance from the aperture. The temperature measurement can be made in various ways, both thermally and thermoelectrically, and directly reflects the modulation of the heat transport by the gas flow.

Advantageously, the modulation of the heat transport is extremely fast and does not represent a limiting factor with regard to a dynamic resolution of the sensor. The thermal resistance of the membrane, the size of the aperture or the heat capacity of the hot junctions of a temperature sensor can be additionally optimized to ensure a particularly high signal-to-noise ratio for the detection of the PAS signals.

Figure 18:
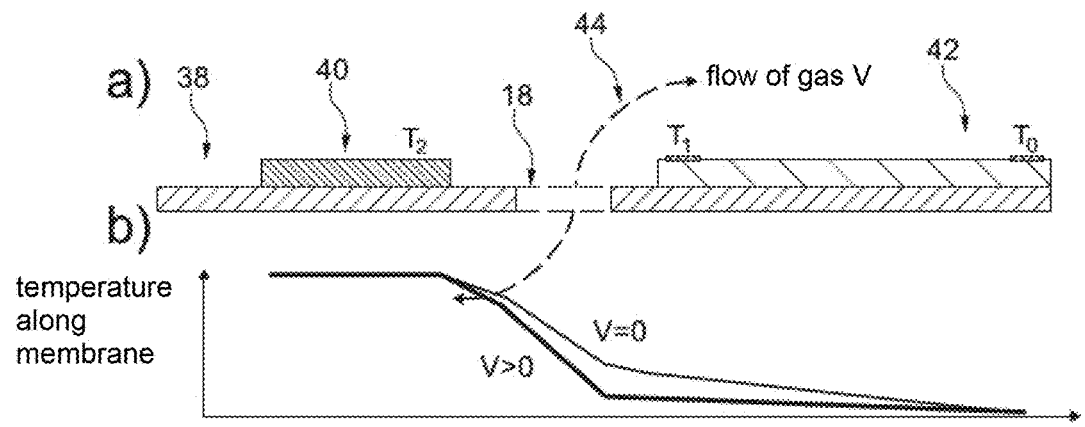
Figure 19:
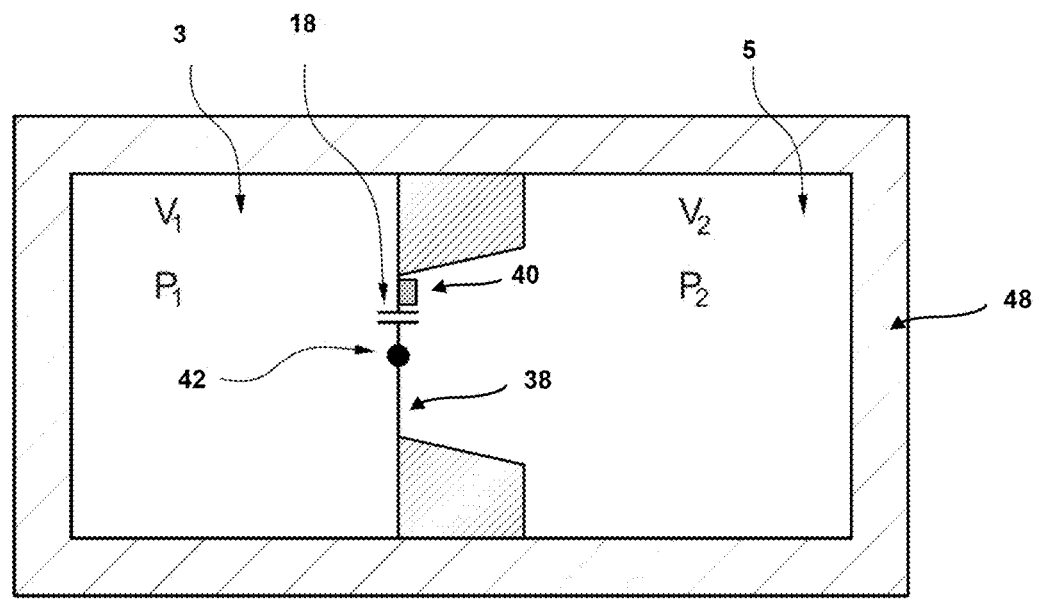
Figure 20:
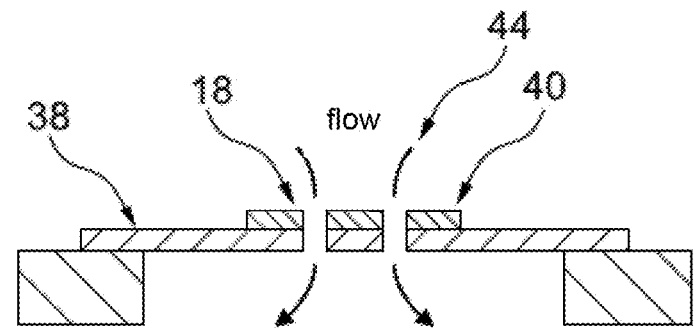
Figure 20:
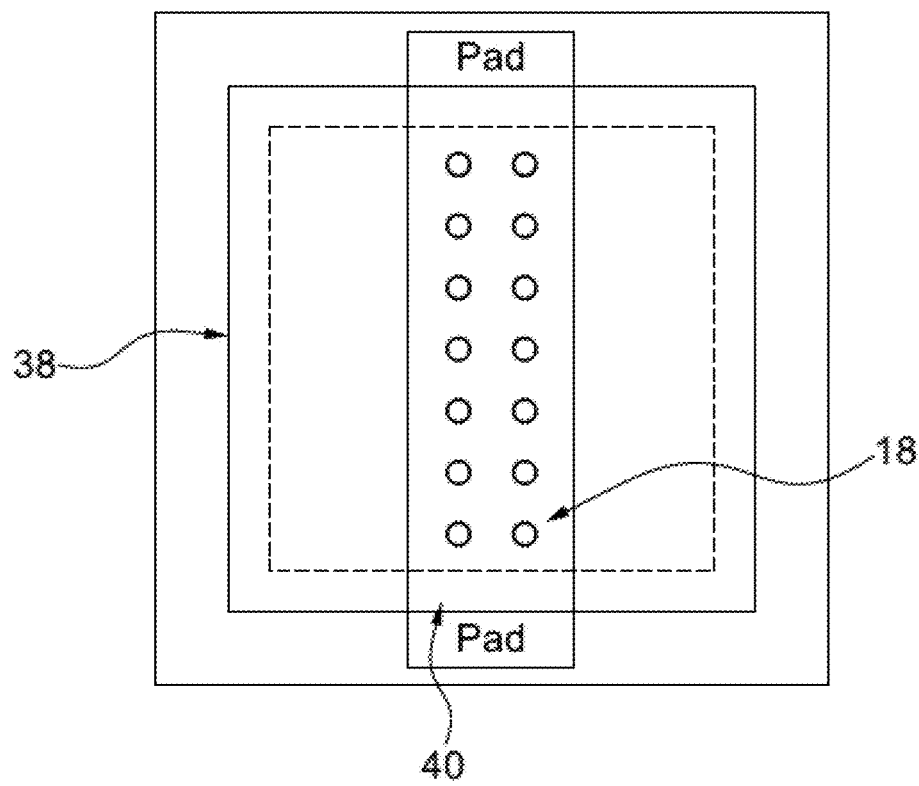

FIGS. 18-20 illustrate other preferred embodiments of a sensor for measuring a PAS signal based on gas flow 44 through the aperture 18 of a partition 38.

As shown in FIG. 18, it is preferred that two chambers (e.g., a detection chamber 3 and a reference chamber 5) are separated from each other by means of a partition 38 in such a way that gas flow 44 is enabled only through one or more well-defined apertures 18.

A pressure equalization between the first chamber ($V_1$, $P_1$) and the second chamber ($V_2$, $P_2$), for example due to a photoacoustic excitation of gas molecules in one of the chambers, will therefore take place purposefully through the aperture in the form of a (ventilating) gas flow. By means of the MEMS sensor, the gas flow can be determined quickly and precisely, for example, as a modulation of a heat flow across the aperture or on the basis of a cooling effect of a heating element.

Advantageously, the choice of a particularly small cross-sectional area of the aperture can also ensure that sufficiently high flow velocities can occur through the aperture to reliably detect the PAS signals, even in the case of very low PAS signals. The possible implementation of small apertures in the context of MEMS-based fabrication thus allows both high sensitivity and further miniaturization of photoacoustic gas sensors.

FIGS. 19 and 20 illustrate preferred embodiments in which a plurality of apertures are introduced into the partition or membrane 38 to increase measurement accuracy.

In the embodiment shown in FIG. 20, the sensor comprises a heating element 40, which is preferably configured as a flat pad and is installed on the partition 38. The heating element 40 comprises a plurality of openings corresponding to the apertures 18 of the partition. A flow of gas through the apertures 18 results in cooling of the heating element 40, which can be measured, for example, by means of a temperature sensor (not shown). By providing a plurality of apertures on the partition or membrane 38, the cooling effect of the gas flow can be enhanced and the signal-to-noise ratio improved.

Figure 21:
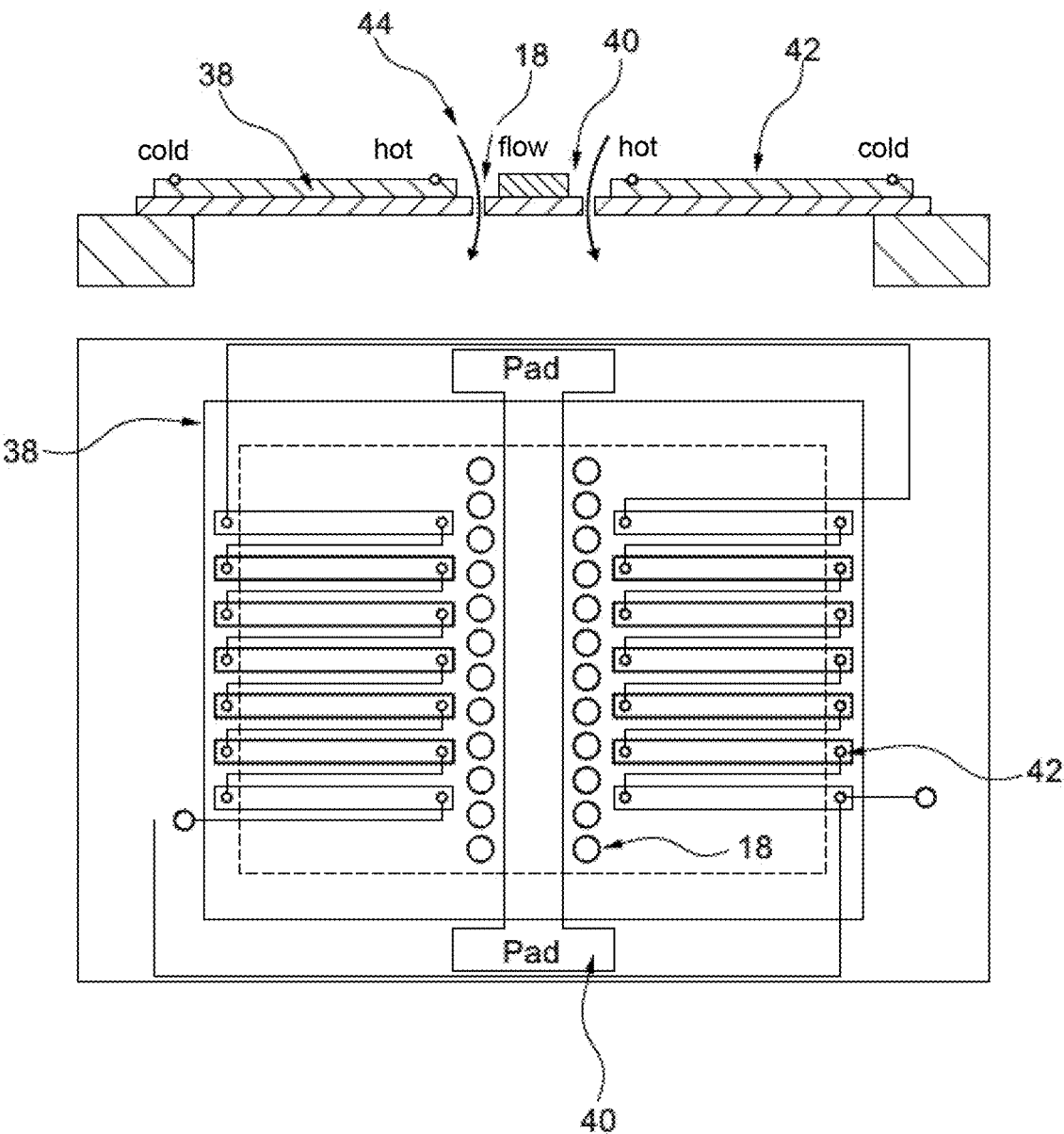

FIG. 21 illustrates an embodiment in which the sensor comprises a heating element 40, which is configured as a flat pad, and a plurality of temperature sensors 42, which are preferably configured as thermopiles. The heating element 40 and the temperature sensors 42 are installed on the partition or membrane 38 in such a way that apertures 18 are located between the heating element 40 and the plurality of temperature sensors 42.

As explained above, the heat flow from the central heating element 40 to the temperature sensors 42 is sensitive to a gas flow 44 through the aperture 18. The modulation of the heat flow by the gas flow 44 can preferably be determined by means of a thermopile, which precisely determines the temperature difference between a contact point (hot junction) in the immediate vicinity of the aperture 18 and the end of the thermopile facing away from the heating element 40.

Figure 22:
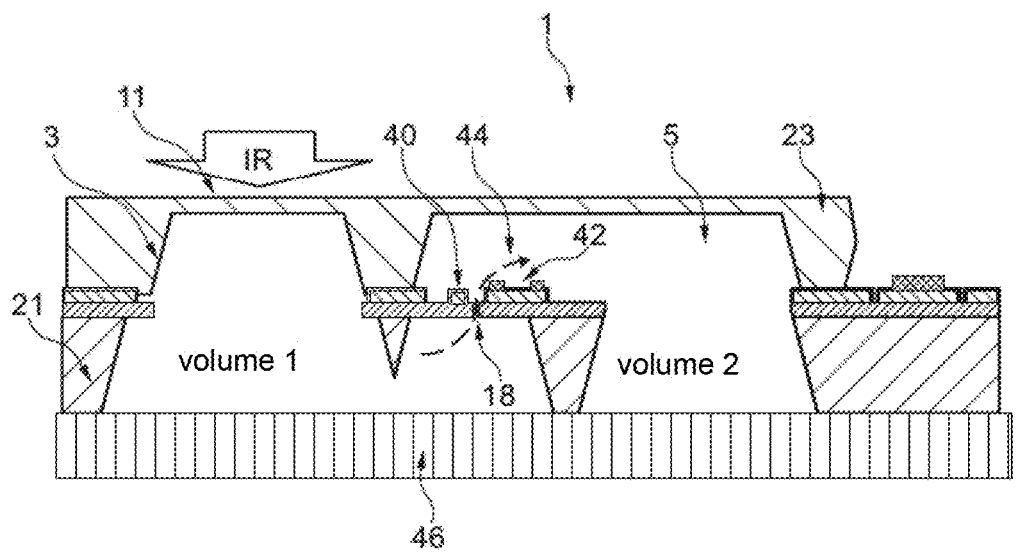

FIG. 22 shows a gas sensor 1 made of two bonded wafer layers in which the described sensor is integrated. The lower system wafer 21 (gray) contains cavities and the sensor element. There can also be laterally derived connection pads for any electronics for reading the sensor as well as optional tunable IR filters on the underside. The cap wafer 23 (green) contains complementary cavities. Both wafers are preferably bonded to each other using wafer bonding technology (hermetically if necessary). The manufacturing steps shown in FIGS. 7-17 for a gas sensor made of two wafer layers can be applied analogously.

In the produced gas sensor 1, the detection chamber 3 (Volume 1) and reference chamber 5 (Volume 2) are sealed from each other in a gas-tight manner by a separating membrane 38.

Inside the separating membrane 38 there is at least one aperture 18, through which a gas flow between the chambers is made possible. The IR radiation 11 modulated with a modulation frequency preferably impinges on the detection chamber (Volume 1).

If the modulated irradiation takes place with an infrared wavelength corresponding to the absorption spectrum of a molecule of a gas component present in the gas mixture, modulated absorption takes place, which causes heating and cooling processes whose time scales reflect the modulation frequency of the radiation. According to the photoacoustic effect, the heating and cooling processes cause expansions and contractions of the gas component causing the gas component to form sound pressure waves with substantially the modulation frequency. The sound pressure waves can be measured as a gas flow 44 through the aperture 18 by means of the sensor.

The sensor comprises a heating element 40 as well as a temperature sensor 42, which can be configured, for example, as a thermopile, which are arranged on the separating membrane 38 in such a way that the aperture 18 is located between them.

As explained above, in the case of a PAS signal, the gas flow 44 through the aperture 18 causes a modulation of the heat transport between the heating element 40 and the temperature sensor 42, which enables a fast and reliable detection.

The modulation of the heat transport by the gas flow 44 advantageously represents a particularly sensitive measure for the determination of PAS signals, which can be further optimized in particular by optimizing the dimensioning of the apertures 18, the thermal resistance of the partition or membrane 38, and the heat capacity of the thermocouples of a thermopile 42.

Figure 23:
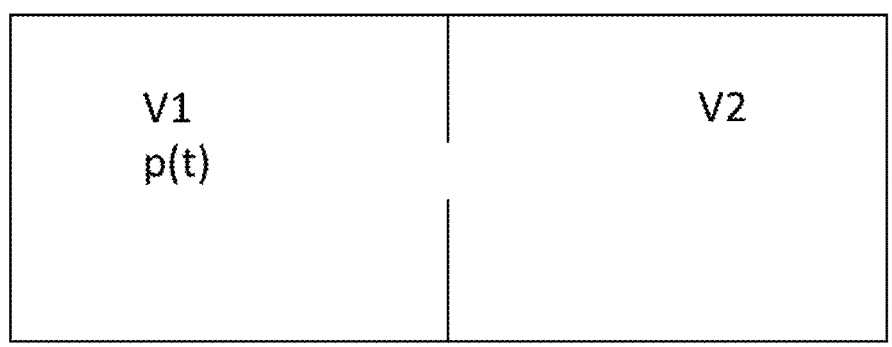
Figure 23:
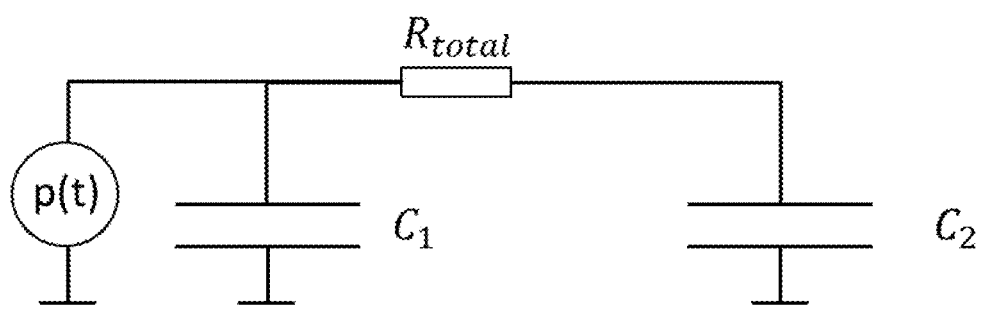

FIG. 23 schematically illustrates a modeling approach for optimizing the signal-to-noise ratio of the described sensor, which can measure the generation of (sound) pressure waves or PAS signals based on a gas flow through the aperture of a partition.

The sound dynamics of such a sensor preferably depend on the sound resistance of the aperture:

$$R_{aperture} = \frac{3\eta}{r^3}$$

with $\eta$ as dynamic viscosity of the gas and r as the radius of the aperture, where in the case of a plurality n of apertures the total resistance is given as $R_{total} = R_{aperture}/n$.

On the other hand, the dynamics are characterized by the sound capacity $$C_A = \frac{V}{\rho c^2},$$

Wherein V denotes the volume of a respective chamber, $\rho$ the density of the gas and c the acoustic velocity (see Sattler, Robert; Physikalisch basierte Mixed-Level Modellierung von gedämpften elektromechanischen Mikrosystemen [*Physically based mixed-level modeling of attenuated electromechanical microsystems*]; Dissertation; Technical University of Munich, 2007).

The characteristic time constant $\tau$ for the determination of a time-dependent (sound) pressure change p(t) in a first volume by means of the sensor, can be expressed as the product of the sound resistance $R_{total}$ and the capacitance of the second volume $C_2$ as follows:

$$\tau = R_{total} C_2 = \frac{3\eta}{n\, r^3} \frac{V_2}{\rho c^2}$$

For the example case of n=20 apertures with a radius r=5 μm and a volume of the reference chamber of 1 mm³, a characteristic time constant $\tau$ of 0.15 ms can be obtained for air-like gases ($\eta$=1.8E-5 kg/m/s, $\rho$=1.23 kg/m³, c=340 m/s).

Sound pressure changes with frequencies of several hundred Hz can thus be easily resolved. The described sensor principle is thus highly suitable for photoacoustic spectroscopy, which typically uses modulation frequencies of an exciting IR emitter of a few Hz to 100 Hz. High-frequency modulation is also reliably detected.

Advantageously, the signal-to-noise over a wider frequency range is suitable for sufficient measurement accuracy. Factors for noise include the sound resistance of the aperture, the heating element or the sensor. Further noise factors concern the Johnson noise $V_{rms} = \sqrt{4k_B T R_{el,th,mech} \Delta f}$ or additional noise signatures related to the heat transport across the aperture.

In preferred embodiments, the noise factors are modeled to achieve additionally improved resolution of the photoacoustic gas sensor based on a minimization of dominant noise factors.

REFERENCE LIST

1 Gas sensor
3 Detection chamber
5 Reference chamber
7 Sensor channel
9 IR emitter
11 IR radiation
13 Measurement path
15 Opening to the detection chamber
16 Tunable filter
17 Flow sensor
18 Aperture
19 Capacitive microphone
20 MEMS membrane/electrode
21 System wafer
22 Counter electrode
23 Cap wafer
25 Substrate/Wafer for System Wafer
27 Oxide layer
29 Polysilicon layer
31 Etched cavity
33 Through-hole plating/conductor path
35 Substrate/Wafer for Cap Wafer
36 Heating wire for an anemometer
37 Piezoelectric bending cantilever
38 Partition, preferably membrane
40 Heating element
42 Temperature sensor, for example thermopile
44 Gas flow
46 Substrate with optional IR window or inlet/outlet ports
48 Housing

BIBLIOGRAPHY

[1] von Huber, J.: Miniaturisierter photoakustischer Gassensor für den Nachweis von Kohlendioxid [*Miniaturized photoacoustic gas sensor for the detection of carbon dioxide*], Der Andere Verlag, 2016.

The invention claimed is:
1. A photoacoustic gas sensor comprising:
a modulable infrared emitter,
a gas-fillable detection chamber,
a reference chamber, a sensor channel connecting the detection chamber to the reference chamber, and a sensor which is located in the sensor channel or is adjacent to the sensor channel, wherein the detection chamber is present in the beam path of the infrared emitter such that the infrared emitter can excite gas in the detection chamber by means of modulably emittable infrared radiation to generate a sound pressure and an equalization of the sound pressure through the sensor channel into the reference chamber can be detected by means of the sensor, wherein the detection chamber, the sensor channel, the reference chamber and the sensor are arranged in a lateral plane which is substantially perpendicular to the radiation direction of the IR emitter, and wherein the detection chamber, the sensor channel, the reference chamber and the sensor element are formed in a multilayer substrate and wherein the reference chamber and the sensor channel with the sensor are not located in the beam path of the infrared emitter.

2. The photoacoustic gas sensor according to claim 1 wherein the multilayer substrate comprises at least two substrate layers selected from the group consisting of monocrystalline silicon, polysilicon, silicon dioxide, silicon carbide, silicon germanium, silicon nitride, nitride, germanium, carbon, gallium arsenide, gallium nitride, indium phosphide and glass.

3. The photoacoustic gas sensor according to claim 1, wherein the multilayer substrate is formed by bonding at least two wafers, preferably comprising a lower system wafer comprising the sensor and having at least one lower cavity and an upper cap wafer having upper cavities complementary to the at least one lower cavity such that the reference chamber and detection chamber are formed by bonding the lower system wafer and the upper cap wafer.

4. The photoacoustic gas sensor according to claim 1, wherein the detector chamber and/or the reference chamber has a height of from 10 µm to 2 mm.

5. The photoacoustic gas sensor according to claim 1, wherein the detector chamber and/or the reference chamber has a length or width of from 100 µm to 5 mm.

6. The photoacoustic gas sensor according to claim 1, wherein the sensor channel has a length of from 1 µm to 500 µm.

7. The photoacoustic gas sensor according to claim 1, wherein the sensor channel has a cross-section of from 1 µm² to 250 000 µm².

8. The photoacoustic gas sensor according to claim 1, wherein the sensor is a sound pressure detector.

9. The photoacoustic gas sensor according to claim 1, wherein the sensor is a capacitive microphone comprising a MEMS membrane as an electrode as well as a counter electrode.

10. The photoacoustic gas sensor according to claim 1, wherein the sensor is a flow sensor.

11. The photoacoustic gas sensor according to claim 10, wherein the flow sensor is located in the sensor channel and forms an aperture.

12. The photoacoustic gas sensor according to claim 1, wherein the detection chamber and the reference chamber are at least partially separated by a partition, having at least one aperture forming the sensor channel and wherein the sensor is at least partially arranged on the partition and is adapted to measure a gas flow between the detection chamber and reference chamber through the at least one aperture.

13. The photoacoustic gas sensor according to claim 12, wherein the sensor comprises at least one heating element and at least one temperature sensor, which are installed on the partition such that the at least one aperture is located between the heating element and the at least one temperature sensor, such that a gas flow between the detection chamber and the reference chamber is measurable through the at least one aperture based on a modulation of a heat flow along the partition between the heating element and the at least one temperature sensor.

14. The photoacoustic gas sensor according to claim 12, wherein the sensor comprises at least one heating element, which has openings corresponding to the at least one aperture and is installed on the partition, and wherein a gas flow between the detection chamber and the reference chamber through the at least one aperture and the corresponding opening of the heating element can be measured by cooling of the heating element.

15. The photoacoustic gas sensor according to claim 12, wherein the partition has at least 2, 3, 4, 5, 6, 7, 8, 9, 10 or more apertures.

16. The photoacoustic gas sensor according to claim 12, wherein the at least one aperture has a cross-sectional area between 1 µm² and 10 000 µm².

17. The photoacoustic gas sensor according to claim 1, wherein the detector chamber, the sensor channel and the reference chamber form a closed system which is filled with a reference gas and a gas to be analyzed is present in the beam path between the infrared emitter and the detection chamber, so that the proportion of the reference gas in the gas to be analyzed can be measured on the basis of the formation of sound pressure waves in the detection chamber.

18. The photoacoustic gas sensor according to claim 1, wherein the detection chamber is an open system having one or more openings such that a gas to be analyzed can flow or diffuse into the detection chamber.

19. The photoacoustic gas sensor according to claim 18, wherein the detection chamber has two or more openings with a maximum extension in at least one direction of 1 nm to 500 µm.

20. The photoacoustic gas sensor according to claim 1, wherein the infrared emitter permits wavelength-selective radiation and/or a wavelength-selective filter is located in the beam path between the infrared emitter and the detection chamber.

21. A method of manufacturing the photoacoustic gas sensor according to claim 1 comprising the steps of:

providing at least two substrate layers;

depositing at least one layer of a conductive material on a first substrate layer and/or structuring a conductive material on the first substrate layer to form a MEMS sensor;

etching cavities in the first and/or second substrate layer, and bonding the first substrate layer to the second substrate layer to form the detection chamber, the reference chamber and the sensor channel, wherein the sensor channel connects the detection chamber to the reference chamber and the sensor is integrated in the sensor channel or is adjacent to the sensor channel.

22. The manufacturing process according to claim 21, wherein:

the etching and/or structuring is selected from the group comprising dry etching, wet chemical etching and/or plasma etching, in particular reactive ion etching, reactive ion deep etching (Bosch process);

the deposition is selected from the group comprising physical vapor deposition (PVD), in particular thermal evaporation, laser beam evaporation, arc evaporation, molecular beam epitaxy, sputtering, chemical vapor deposition (CVD) and/or atomic layer deposition (ALD), and/or the bonding of the substrate layers is selected from the group comprising wafer bonding, direct bonding, surface activated bonding, plasma activated bonding, anodic bonding, eutectic bonding, weld bonding, glass frit bonding and/or adhesive bonding.

23. A method for analyzing gas comprising:
a. providing a photoacoustic gas sensor for analyzing gas according to claim 1,
b. providing a gas to be analyzed in the beam path between the infrared emitter and the detection chamber or within the detection chamber,
c. irradiating the gas to be analyzed and the detection chamber with infrared radiation modulated with a modulation frequency in order to generate sound pressure waves,
d. measuring the generated sound pressure waves by means of the sensor, and
e. characterizing the gas to be analyzed based on the measurement results.

\* \* \* \* \*